United States Patent
Yoshimoto

(10) Patent No.: US 12,422,559 B2
(45) Date of Patent: Sep. 23, 2025

(54) RANGING DEVICE WITH IMPROVED SENSITIVITY

(71) Applicant: DENSO CORPORATION, Kariya (JP)

(72) Inventor: Naoki Yoshimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 980 days.

(21) Appl. No.: 17/455,635

(22) Filed: Nov. 18, 2021

(65) Prior Publication Data

US 2022/0075073 A1 Mar. 10, 2022

Related U.S. Application Data

(63) Continuation of application No. PCT/JP2020/019128, filed on May 13, 2020.

(30) Foreign Application Priority Data

May 20, 2019 (JP) ................. 2019-094685

(51) Int. Cl.
*G01S 7/481* (2006.01)
*G01J 1/42* (2006.01)
*G01S 17/58* (2006.01)
*G01S 17/89* (2020.01)
*G01S 17/931* (2020.01)

(52) U.S. Cl.
CPC ........... *G01S 17/931* (2020.01); *G01J 1/4204* (2013.01); *G01S 7/4816* (2013.01); *G01S 7/4817* (2013.01); *G01S 17/58* (2013.01); *G01S 17/89* (2013.01)

(58) Field of Classification Search
CPC .................................................. G01S 7/48–51
See application file for complete search history.

(56) References Cited

U.S. PATENT DOCUMENTS

| | | | | |
|---|---|---|---|---|
| 6,522,396 | B1* | 2/2003 | Halmos | G01S 7/4873 |
| | | | | 382/106 |
| 2012/0134598 | A1* | 5/2012 | Ovsiannikov | G01S 7/4816 |
| | | | | 382/217 |
| 2013/0176386 | A1* | 7/2013 | Midavaine | H04N 23/698 |
| | | | | 348/36 |
| 2017/0363740 | A1* | 12/2017 | Kubota | G01S 7/484 |
| 2018/0188373 | A1 | 7/2018 | Yokota et al. | |
| 2021/0166354 | A1* | 6/2021 | Veit | G06T 5/70 |

\* cited by examiner

Primary Examiner — Yuqing Xiao
Assistant Examiner — Sean C. Grant
(74) Attorney, Agent, or Firm — Maschoff Brennan

(57) ABSTRACT

In a ranging device, a background light calculation unit calculates, for each of a plurality of bearing regions, a background light level parameter related to a level of background light arriving from the bearing region. A coefficient calculation unit calculates multiplier coefficients for the bearing regions such that the multiplier coefficient for each peripheral bearing region around a subject bearing region is negatively correlated with a difference in the background light level parameter between the subject bearing region and the peripheral bearing region. A coefficient-multiplied waveform generation unit generates, for each of the subject bearing region and the peripheral bearing regions, coefficient-multiplied waveform data acquired by multiplying ranging waveform data by the corresponding multiplier coefficient. An integrated waveform generation unit generates integrated waveform data by integrating the coefficient-multiplied waveform data for the subject bearing region and the peripheral bearing regions.

8 Claims, 25 Drawing Sheets

AXIS OF ROTATION

FIG.20
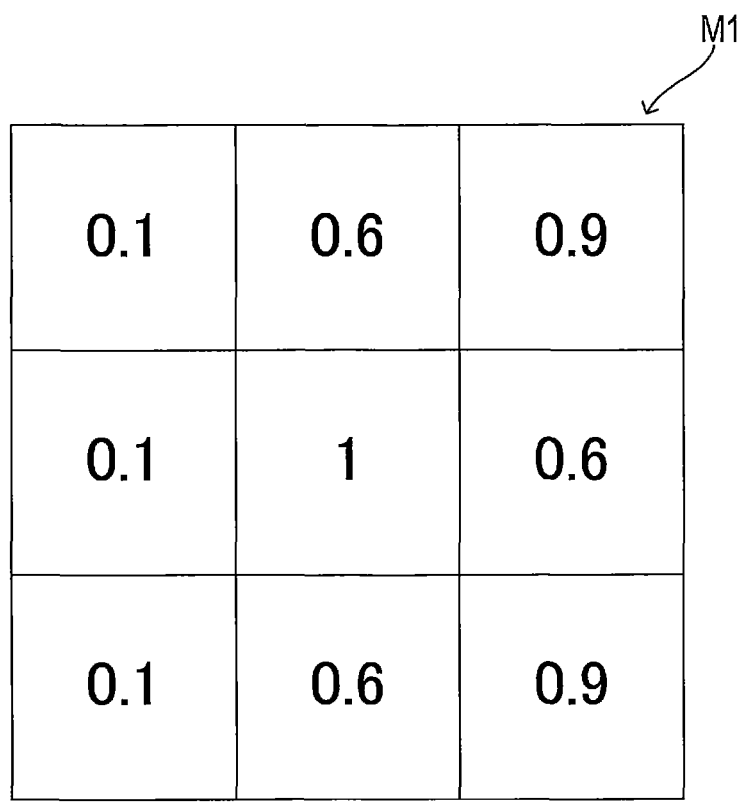
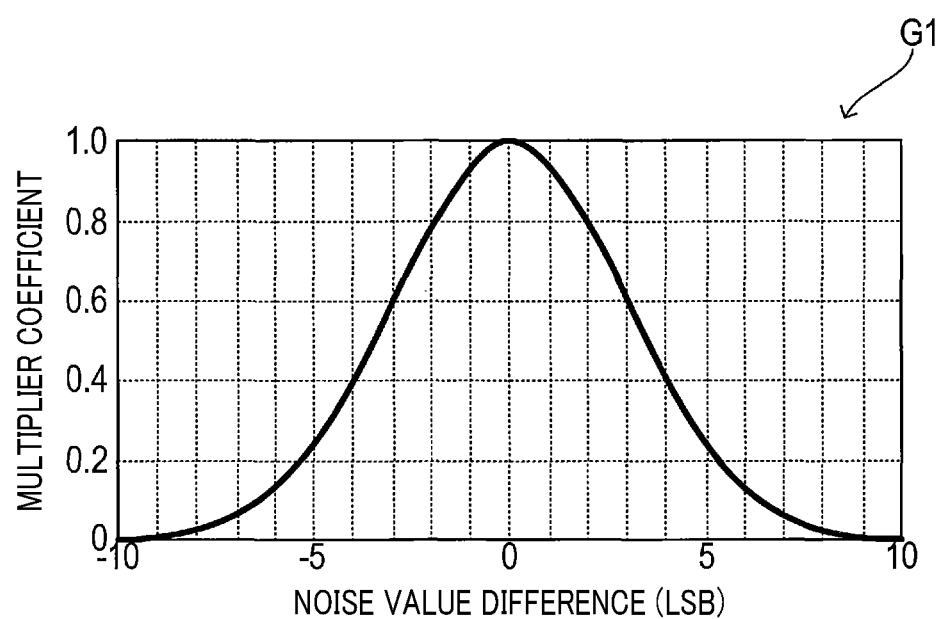

RANGING DEVICE WITH IMPROVED SENSITIVITY

CROSS-REFERENCE TO RELATED APPLICATION

This application is a continuation application of International Application No. PCT/JP2020/019128 filed May 13, 2020 which designated the U.S. and claims priority to Japanese Patent Application No. 2019-94685 filed with the Japan Patent Office on May 20, 2019, the contents of each of which are incorporated herein by reference.

BACKGROUND

Technical Field

The present disclosure relates to a ranging device that emits light and measures a distance to an object that reflects the light.

Related Art

A ranging device is known that includes a scanning unit that performs a scan with laser light projected by a light projecting unit, a light receiving unit that receives reflected light corresponding to the laser light projected at predetermined intervals, an integration unit that integrates a time series of received light intensity signals output from the light receiving unit, and a distance calculation unit that calculates a distance to an object based on a result of integration performed by the integration unit.

BRIEF DESCRIPTION OF THE DRAWINGS

In the accompanying drawings:
FIG. 20 illustrates a specific example of multiplier coefficients and a graph of a relational expression (1)

DESCRIPTION OF SPECIFIC EMBODIMENTS

Figure 1A:
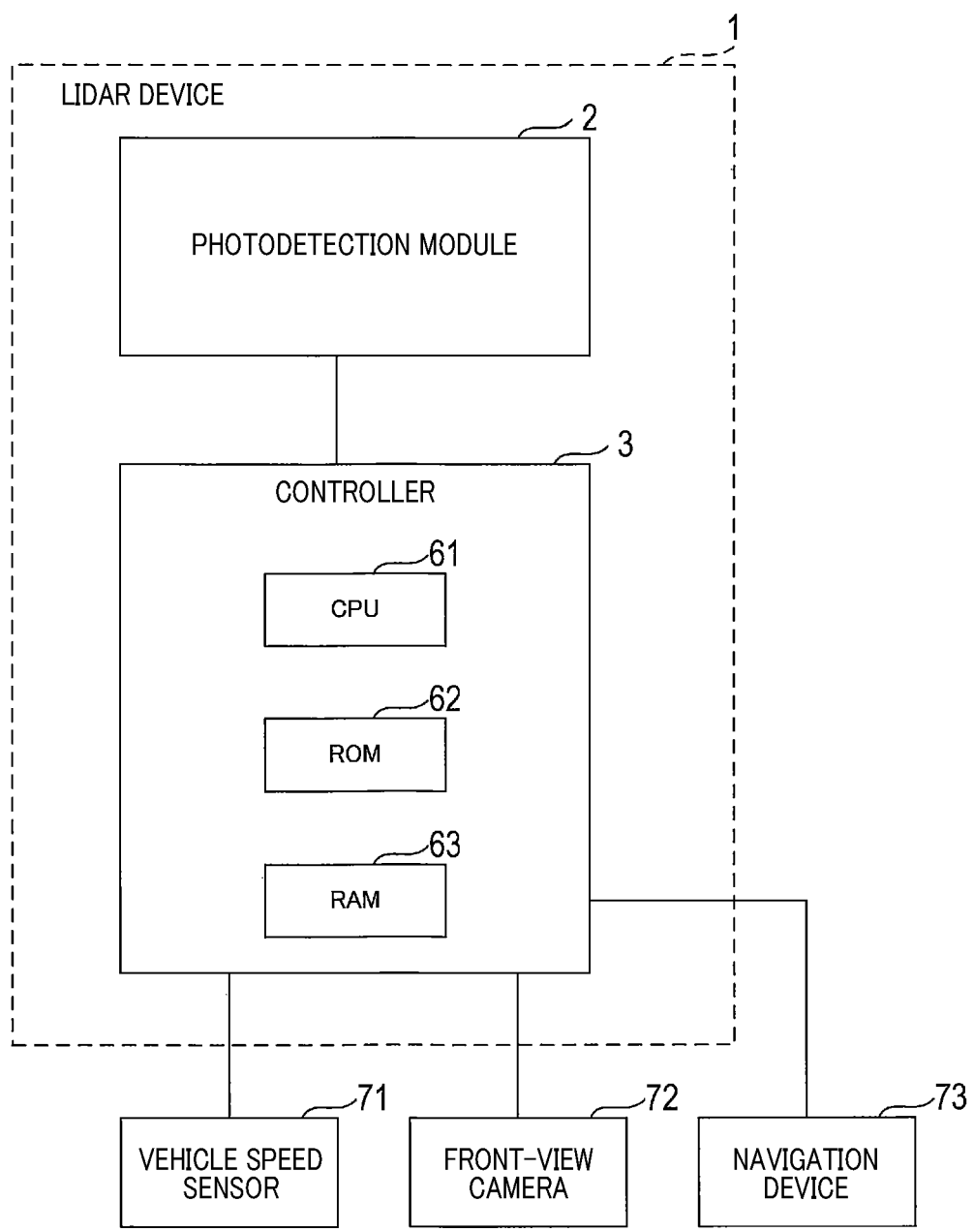
FIG. 1A is a block diagram of a LiDAR device.

According to detailed research that was performed by the present inventors, an issue was found that, in the above known technique as closed in JP-A-2018-109560, the detection sensitivity of the reflected light is low due to the effect of noise detected in light receiving unit.

The present disclosure improves the detection sensitivity of reflected light.

One aspect of the present disclosure provides a ranging device including a light emitting unit, a light detection unit, a background light calculation unit, a subject bearing-azimuth selection unit, a coefficient calculation unit, a ranging waveform generation unit, a coefficient-multiplied waveform generation unit, an integrated waveform generation unit, and a measurement unit.

The light emitting unit is configured to emit light. The light detection unit is configured to detect the reflected light.

The background light calculation unit is configured to calculate, for each of a plurality of bearing regions formed by dividing a light irradiated region that is irradiated with the light, a background light level parameter related to a level of background light arriving from the bearing region based on a result of detection by the light detection unit.

The subject bearing-azimuth selection unit is configured to sequentially select one of the plurality of bearing regions as a subject bearing region.

The coefficient calculation unit is configured to calculate a multiplier coefficient for each of the subject bearing region selected by the subject bearing-azimuth selection unit and a plurality of peripheral bearing regions around the subject bearing region such that the multiplier coefficient for each of the plurality of peripheral bearing regions is negatively correlated with a difference between the background light level parameter for the subject bearing region and the background light level parameter for the peripheral bearing region.

The ranging waveform generation unit is configured to generate, for each of the plurality of bearing regions, ranging waveform data indicating time variations of a light detection parameter until expiration of a preset ranging period from emission of the light, the light detection parameter indicating the result of detection by the light detection unit.

The coefficient-multiplied waveform generation unit is configured to generate, for each of the subject bearing region and the plurality of peripheral bearing regions, coefficient-multiplied waveform data acquired by multiplying the corresponding ranging waveform data by the corresponding multiplier coefficient.

The integrated waveform generation unit is configured to generate integrated waveform data by integrating the coefficient-multiplied waveform data for the subject bearing region and the plurality of peripheral bearing regions.

The measurement unit is configured to measure a distance to an object reflecting the light using the integrated waveform data generated by the integrated waveform generation unit.

The ranging device configured as above can reduce randomly generated noise in the integrated waveform data. This is because the ranging device integrates the coefficient-multiplied waveform data for the subject bearing region and the plurality of adjacent bearing regions to measure the distance to the object existing in the bearing direction corresponding to the subject bearing region.

Further, the ranging device calculates the multiplier coefficients for the subject bearing region and the plurality of peripheral bearing regions around the subject bearing region such that the multiplier coefficient for each of the plurality of peripheral bearing regions is negatively correlated with the difference between the background light level parameter for the subject bearing region and the background light level parameter for the peripheral bearing region, and generates the coefficient-multiplied waveform data for each of the subject bearing region and the plurality of peripheral bearing regions by multiplying the corresponding ranging waveform data by the corresponding multiplier coefficient. In cases where background light levels for the respective peripheral bearing regions are higher than the background light level for the subject bearing region, this allows the ranging device of the present disclosure to reduce the contribution of the ranging waveform data for the peripheral bearing regions in the integrated waveform data. Therefore, in cases where background light levels for the respective peripheral bearing regions are higher than the background light level for the subject bearing region, the ranging device can suppress occurrence of a situation where the integrated waveform data becomes noisier than the ranging waveform data for the subject bearing region, and can further reduce the noise in the integrated waveform data.

As described above, the ranging device of the present disclosure can improve the detection sensitivity of the light detection unit detecting the reflected light.

Hereinafter, exemplary embodiments of the present disclosure will be described in detail with reference to the accompanying drawings, in which like reference numerals refer to like or similar elements regardless of reference numerals and duplicated description thereof will be omitted.

First Embodiment

A first embodiment of the present disclosure will be described with reference to the accompanying drawings.

A LiDAR device 1 according to the present embodiment is installed in a vehicle and used to detect various objects around the vehicle. LiDAR is an abbreviation for light detection and ranging.

Figure 1B:
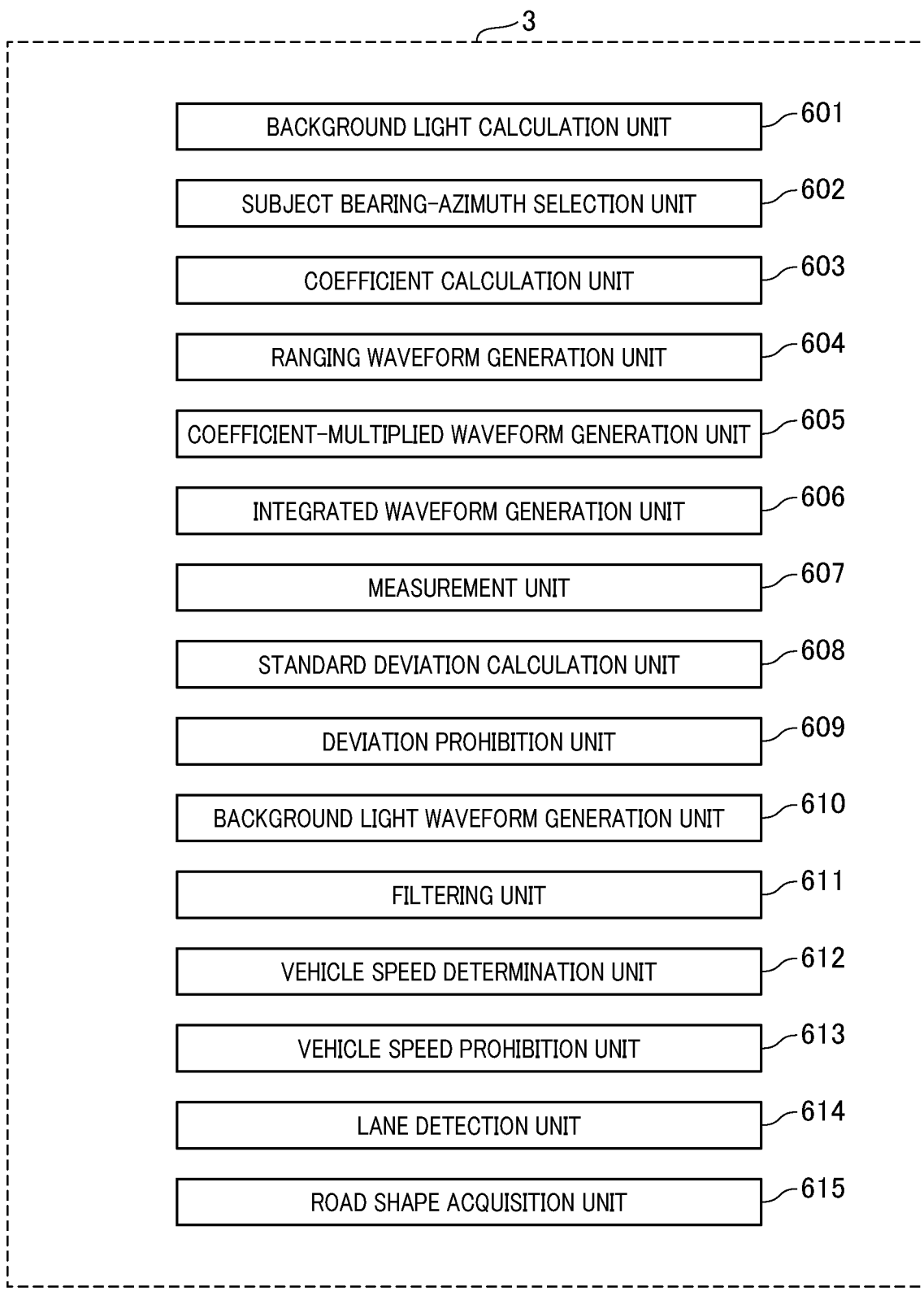
FIG. 1B is a functional block diagram of a controller.

As illustrated in FIG. 1A, the LiDAR device 1 includes a photodetection module 2, which will be described later, and a controller 3. The controller 3 is an electronic control unit configured around a microcomputer including a CPU 61, a ROM 62 and a RAM 63, and the like. Various functions of the microcomputer, as indicated by functional blocks 601-615 (described later) of the controller 3 illustrated in FIG. 1B, are implemented by the CPU 61 executing a program stored in a non-transitory tangible storage medium. In this example, the ROM 62 corresponds to the non-transitory tangible storage medium in which the program is stored. A method corresponding to this program is performed by executing the program. Some or all of the functions implemented by the CPU 61 may be configured in hardware by one or more integrated circuits (ICs) or the like. In addition, one or more microcomputers may configure the controller 3.

A vehicle speed sensor 71, a front-view camera 72, and a navigation device 73 are connected to the controller 3. The vehicle speed sensor 71 detects a travel speed (hereinafter referred to as a vehicle speed) of the vehicle carrying the LiDAR device 1 (hereinafter referred to as an own vehicle), and outputs a vehicle speed detection signal indicating a result of detection to the controller 3. The front-view camera 72 is installed on the front side of the own vehicle and repeatedly images the ground surface ahead of the own vehicle.

The navigation device 73 acquires road map data from a map storage medium having road map data and various information stored, detects a current location of the vehicle based on GPS signals received via GPS antennas and the like, and implements route guidance or the like from the current location to the destination. The above road map data includes various data, such as road locations, road types, road shapes, road widths, road names, numbers of lanes, and road gradients.

Figure 2:
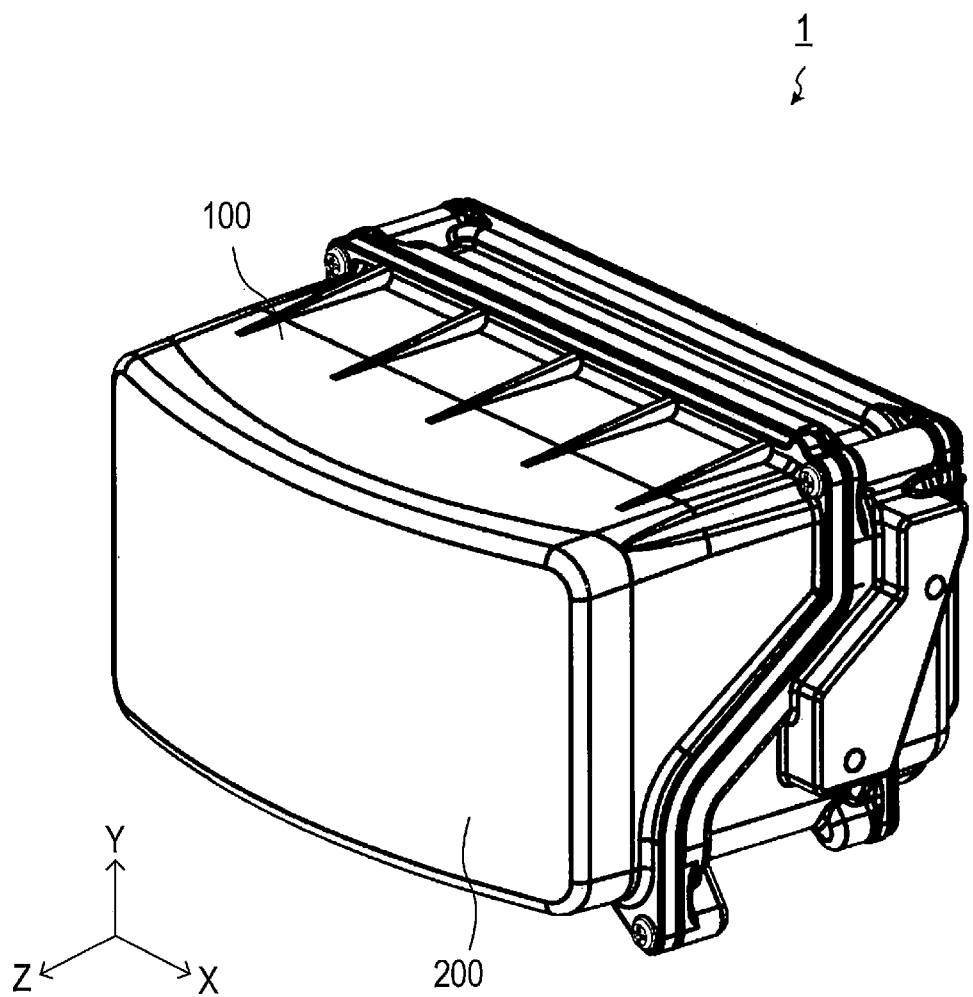
FIG. 2 is a perspective view of the LiDAR device.

The LiDAR device 1, as illustrated in FIG. 2, includes a housing 100 and an optical window 200.

The housing 100 is a rectangular resin box with an opening in one of its six surfaces and contains a photodetection module 2 described later.

The optical window 200 is a resin lid fixed to the housing 100 to cover the opening in the housing 100. The photodetection module 2 installed in the housing 100 emits laser light, which passes through the optical window 200.

Hereinafter, the direction along the length of the substantially rectangular opening is referred to as the X axis direction, the direction along the width of the opening is referred to as the Y axis direction, and the direction orthogonal to the X axis direction and the Y axis direction is referred to as the Z axis direction. Right and left in the X axis direction, and up and down in the Y axis direction are defined as viewed from the opening in the housing 100. In the Z axis direction, forward is defined as a direction from the depth toward the opening in the housing 100, and rearward is defined as a direction toward the depth.

Figure 3:
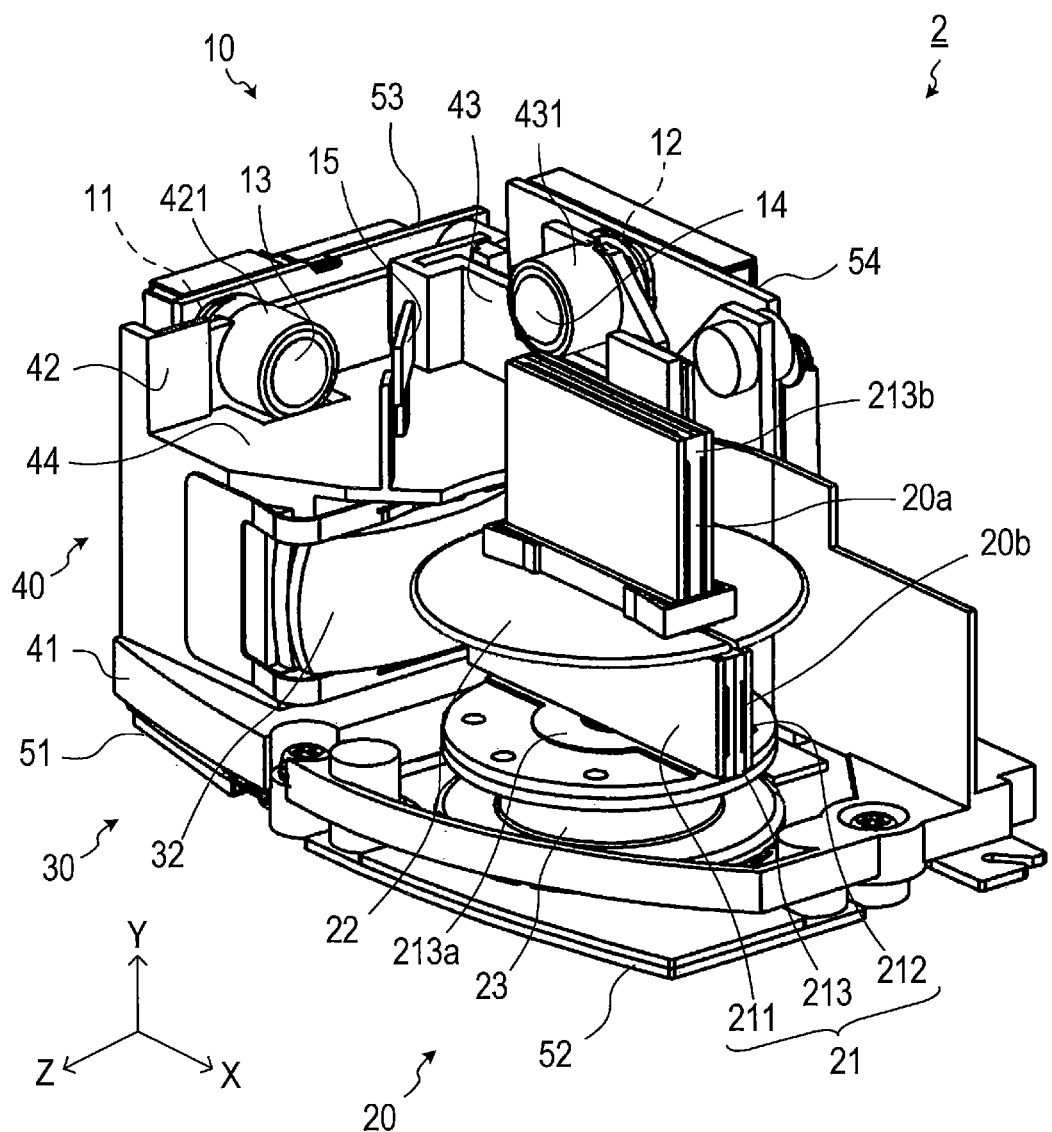
FIG. 3 is a perspective view of a photodetection module.
Figure 4:
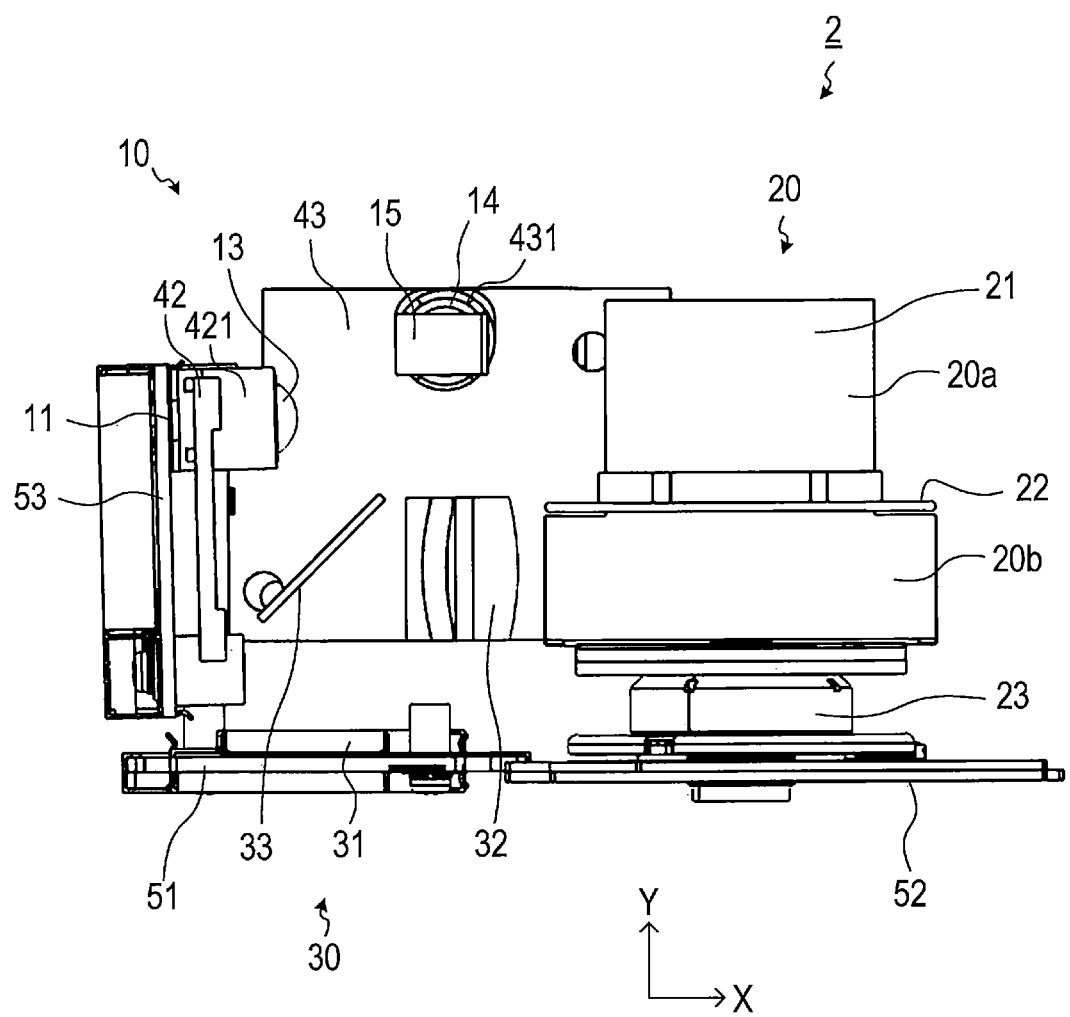
FIG. 4 is a front view of the photodetection module with a part of its frame removed.
Figure 5:
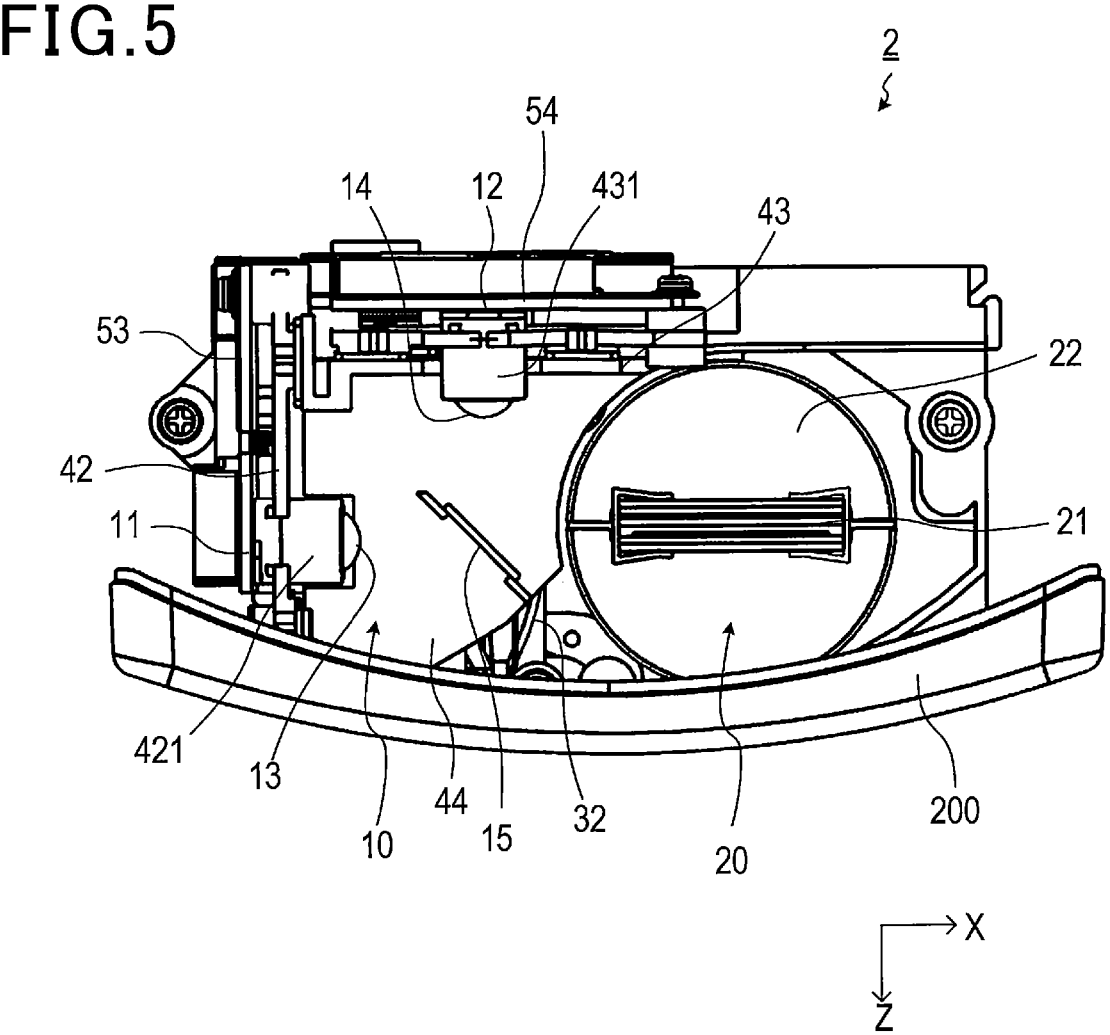
FIG. 5 is a plan view of the LiDAR device with its housing removed.

The photodetection module 2, as illustrated in FIGS. 3, 4, and 5, includes a light projecting unit 10, a scanning unit 20, a light receiving unit 30, and a frame 40. The photodetection module 2 is installed in the housing 100 via the frame 40.

The scanning unit 20 includes a mirror module 21, a partition 22, and a motor 23.

Figure 6:
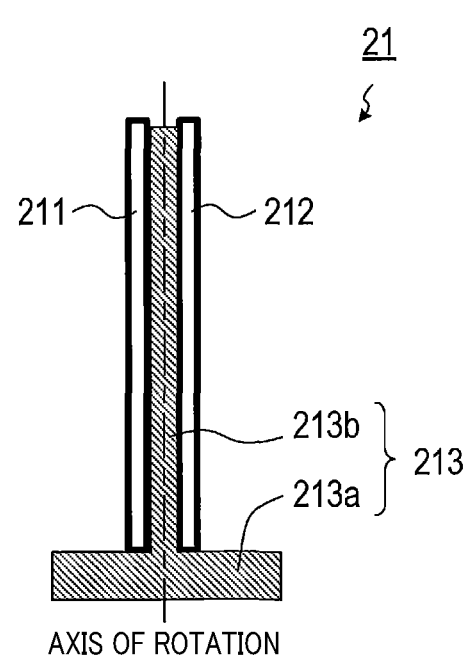
FIG. 6 illustrates a structure of a mirror module.

The mirror module 21, as illustrated in FIG. 6, includes a pair of deflection mirrors 211 and 212 and a mirror frame 213.

The pair of deflection mirrors 211 and 212 are flat members each having a reflective surface that reflects light. The mirror frame 213 includes a circular plate 213a and a support 213b. The circular plate 213a is a disc-shaped portion and fixed to the rotary shaft of the motor 23 at the center of the circle. The support 213b is a plate member with the deflection mirrors 211 and 212 fixed on both sides. The support 213b protrudes from the circular surface of the circular plate 213a in a direction perpendicular to the circular surface of the circular plate 213a.

The deflection mirrors 211 and 212 and the support 213b each have an integrated shape of two rectangles with different lengths. More specifically, the deflection mirrors 211 and 212 and the support 213b have a shape of two integrated rectangles arranged along their central axes extending in the width direction, with the axes aligned with each other. Hereinafter, in the integrated portion of the deflection mirrors 211 and 212 and the support 213b of the mirror module 21, the rectangular part smaller in a longitudinal direction is referred to as a narrower portion, and the rectangular part larger in a longitudinal direction is referred to as a wider portion.

The pair of deflection mirrors 211 and 212 integrated via the mirror frame 213 are placed with the wider portion being under the narrower portion, with the central axis being aligned with the center of the circle of the circular plate 213a and to protrude from the circular surface of the circular plate 213a in a direction perpendicular to the circular surface of the circular plate 213a This arrangement allows the deflection mirrors 211 and 212 to rotate about the rotary shaft of the motor 23 in accordance with the motor driving. The reflective surfaces of the deflection mirrors 211 and 212 are parallel with the rotary shaft of the motor 23 irrespective of the rotational position of the motor 23.

The partition 22 is a disc-shaped member having a diameter equal to the length of the wider portion of the mirror module 21. The partition 22 is divided into two semicircular portions. The two semicircular portions hold the narrower portion of the mirror module 21 from both sides and fixed in contact with a step formed by the wider portion and the narrower portion of the mirror module 21.

Hereinafter, in the deflection mirrors 211 and 212, the part above the partition 22 (i.e., the part of the narrower portion) is referred to as an emitted light deflector 20a and the part below the partition 22 (i.e., the part of the wider portion) is referred to as a received light deflector 20b.

The light projecting unit 10, as illustrated in FIGS. 3 to 5, includes a pair of light sources 11 and 12, a pair of light projection lenses 13 and 14, and an emitted-light turning mirror 15.

Figure 7:
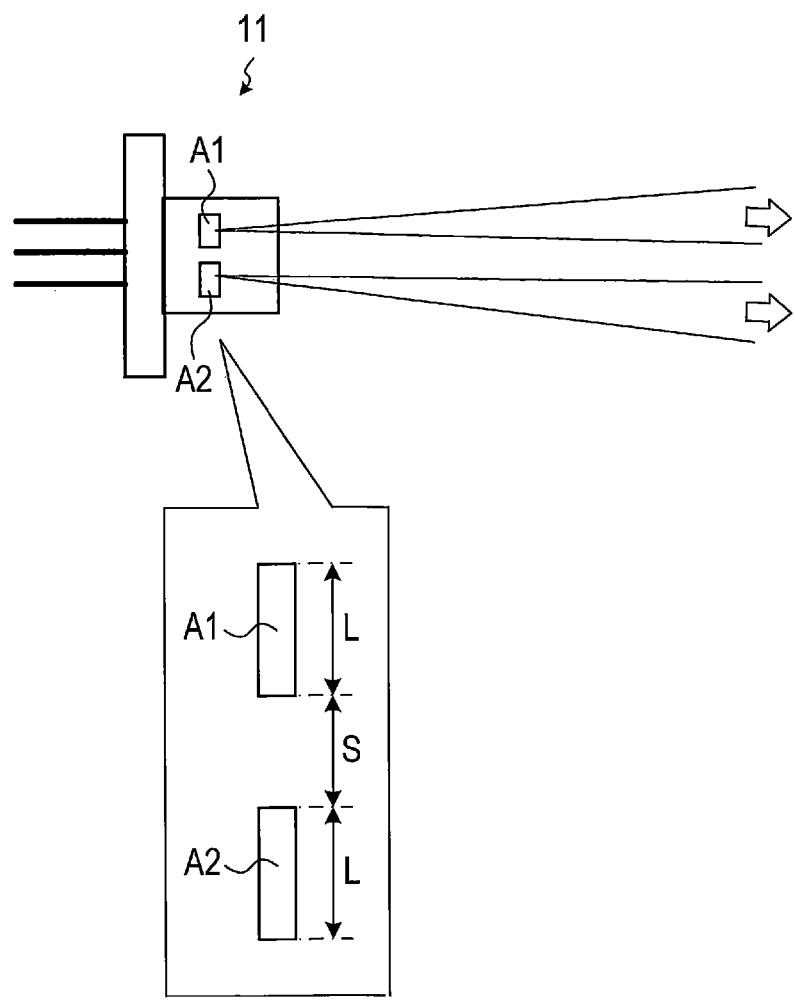
FIG. 7 illustrates a structure of a light source.

The light sources 11 and 12 have the same configuration. Therefore, only the configuration of the light source 11 will be described herein. The light source 11 is, as illustrated in FIG. 7, a so-called multi-stripe semiconductor laser including a plurality of light emitting regions A1 and A2. The light emitting regions A1 and A2 are formed as rectangles arranged in their longitudinal directions. The light emitting regions A1 and A2 have a region length L in the arrangement direction equal to or greater than the region spacing S between the light emitting region A1 and the light emitting region A2. The light emitting regions A1 and A2 emit light beams having optical axes parallel with each other.

Hereinafter, in the emitted light deflector 20a, the point on which light beams are incident from the light sources 11 and 12 is referred to as a reflection point. Furthermore, the plane orthogonal to the rotation axis and including the reflection point is referred to as a reference plane.

As illustrated in FIGS. 3 to 5, the light source 11 is positioned to the left along the X axis away from the reflection point, with the light emitting surface facing the emitted light deflector 20a. The light source 12 is positioned to the rear along the Z axis away from the turning point at or near the middle of the path from the reflection point to the light source 11, with the light emitting surface facing forward along the Z axis. Regarding the positions of the light sources 11 and 12 in the Y axis direction, the light source 11 is placed below the reference plane, and the light source 12 is placed above the reference plane. The light sources 11 and 12 are placed so that the light emitting regions A1 and A2 are arranged in the Y axis direction.

The light projection lens 13 is placed facing the light emitting surface of the light source 11. Similarly, the light projection lens 14 is placed facing the light emitting surface of the light source 12. The light sources 11 and 12 are placed near the focuses of the light projection lenses 13 and 14, respectively.

Figure 9:
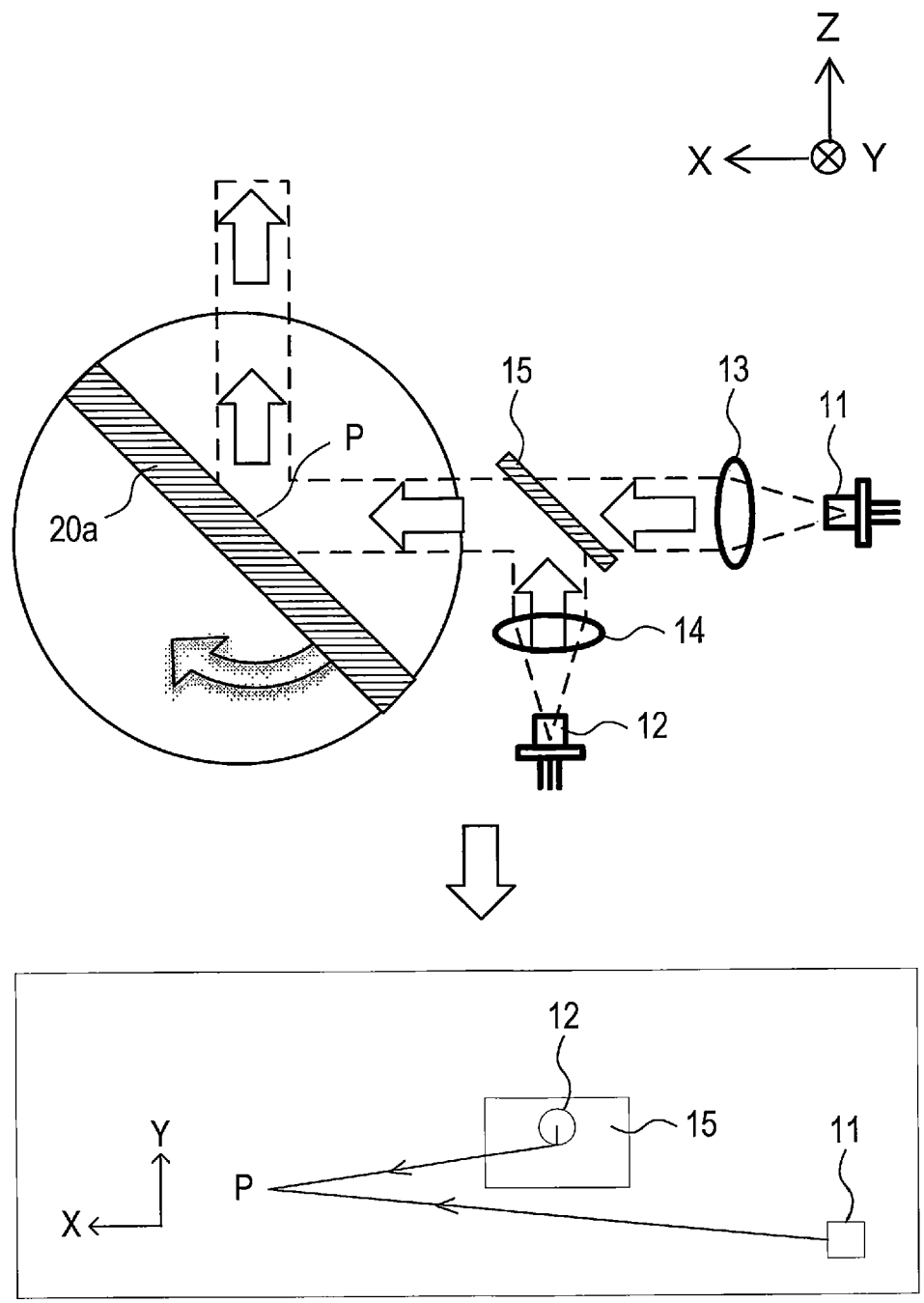
FIG. 9 illustrates a path of emitted light.

The emitted-light turning mirror 15, which is placed at the turning point described above, reflects and guides light emitted from the light source 12 to the reflection point described above. The emitted-light turning mirror 15 is, as illustrated in FIG. 9, placed above the path of light emitted from the light source 11 to the reflection point so as not to obstruct the path. The optical path from the light source 11 to the reflection point has the same length as the optical path from the light source 12 to the reflection point via the emitted-light turning mirror 15. The light source 11 has an optical axis inclined 1 to 2 degrees upward from the reference plane, and the light source 12 has an optical axis inclined 1 to 2 degrees downward from the reference plane. In other words, the optical axes of the light sources 11 and 12 are oriented symmetrically about the reference plane. The angles are not limited to 1 to 2 degrees, but may be determined as appropriate depending on the intended light beam emission angle in the sub-scanning direction.

The light receiving unit 30, as illustrated in FIGS. 3 to 5, includes a light receiving element 31, a light receiving lens 32, and a received light turning mirror 33.

Figure 8:
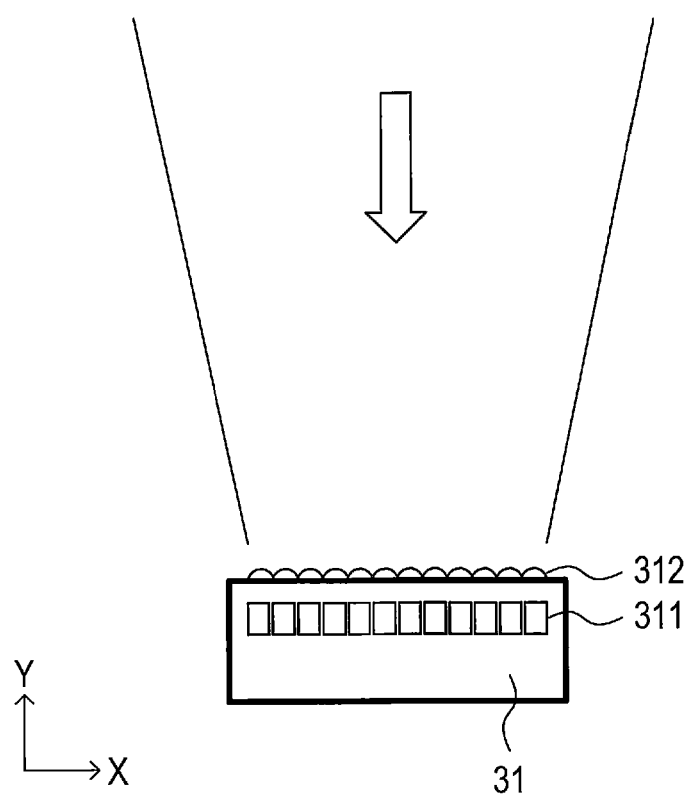
FIG. 8 illustrates a structure of a light receiving element.

The light receiving element 31, as illustrated in FIG. 8, includes an avalanche photodiode array 311 (hereinafter, APD array 311) and a lens array 312. APD is an abbreviation for avalanche photodiode. The APD array 311 includes 12 avalanche photodiodes (hereinafter, APDs) arranged in a row. The lens array 312 includes 12 lenses facing the 12 APDs of the APD array 311 on a one-to-one basis, and narrows and guides light incident on the light receiving element 31 to each APD.

Figure 10:
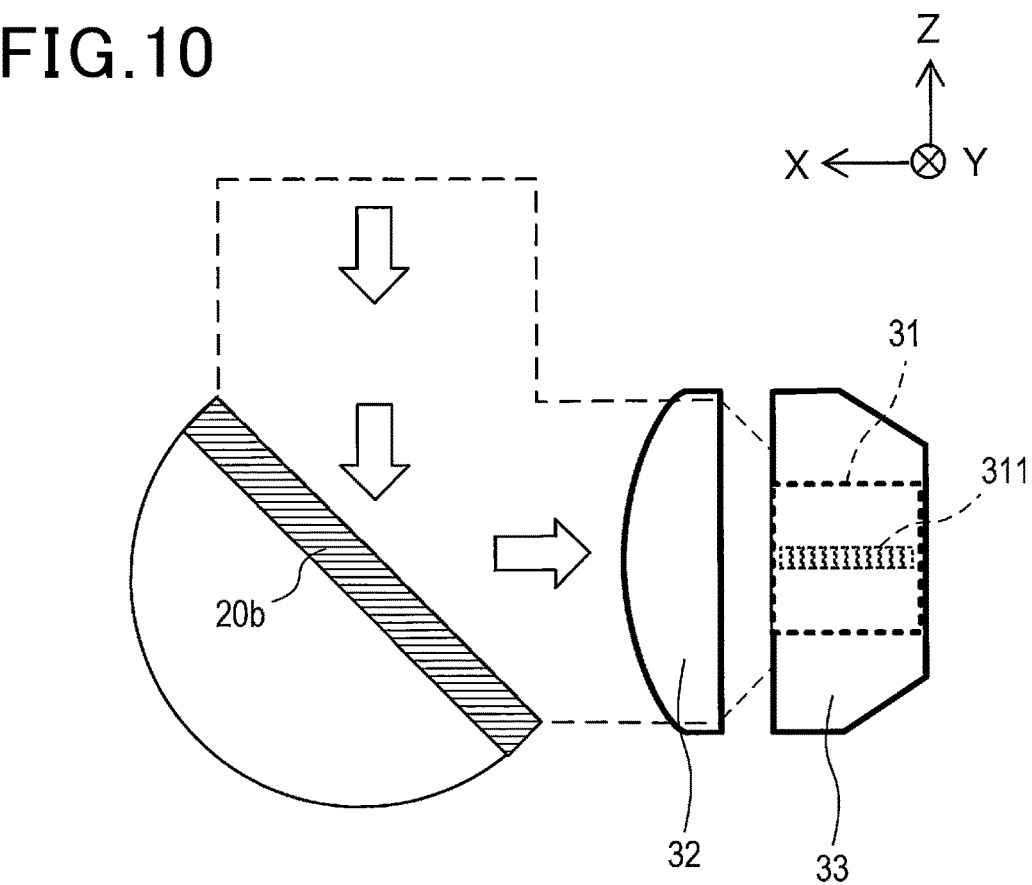
FIG. 10 illustrates a path of received light.

The light receiving element 31 is, as illustrated in FIGS. 4 and 10, placed below the received light turning mirror 33, with the light receiving surface facing upward along the Y axis and the APDs of the APD array 311 aligned with the X axis direction. In FIG. 4, a part of the frame 40 is not illustrated to increase the visibility of each arranged component.

The received light turning mirror 33 is positioned to the left along the X axis from the received light deflector 20b. The received light turning mirror 33 bends the optical path substantially 90 degrees downward in the Y axis direction so that light incident from the received light deflector 20b via the light receiving lens 32 reaches the light receiving element 31.

The light receiving lens 32 is placed between the received light deflector 20b and the received light turning mirror 33. The light receiving lens 32 narrows the light beam incident on the light receiving element 31 so that its width in the Z axis direction becomes substantially equal to the APD element width.

The frame 40 is a member that integrates each component included in the light projecting unit 10, the scanning unit 20, and the light receiving unit 30. That is, the components included in the light projecting unit 10, the scanning unit 20, and the light receiving unit 30 are assembled in the housing 100 with the positional relationship between the components established.

The frame 40, as illustrated in FIGS. 3 to 5, includes a frame bottom 41, a frame side 42, a frame back 43, and a partition 44.

The frame bottom 41 is underlain by a photoreceiver substrate 51 to which the light receiving element 31 is fixed and a motor substrate 52 to which the scanning unit 20 is fixed. Thus, the frame bottom 41 has holes at a site through which light passes from the received light turning mirror 33 to the light receiving element 31, and a site at which the motor 23 of the scanning unit 20 is placed.

The frame side 42 has a front surface, which is the surface facing the scanning unit 20, and a cylindrical holder 421 is installed on the front surface. The holder 421 has the light projection lens 13 fitted in the opening in its front end (i.e., the right end in the X axis direction). The back surface of the frame side 42 is fitted with a photoemitter substrate 53 on which the light source 11 is installed. With the photoemitter substrate 53 being attached to the frame side 42, the light source 11 is placed at the back end of the holder 421 (i.e., the left end in the X axis direction).

In the same manner as for the frame side 42, a holder 431 is installed on the frame back 43. The holder 431 has the light projection lens 14 fitted in its front end (i.e., the forward end in the Z axis direction). The back surface of the frame back 43 is fitted with a photoemitter substrate 54 on which the light source 12 is installed. With the photoemitter substrate 54 being attached to the frame back 43, the light source 12 is placed at the back end of the holder 431 (i.e., the rearward end in the Z axis direction).

The partition 44 is positioned in a manner to define a space in which the components of the light projecting unit 10 are placed and a space in which components of the light receiving unit 30 are placed. The partition 44 is fitted with the emitted-light turning mirror 15, the received light turning mirror 33, and the light receiving lens 32.

The photoreceiver substrate 51 and the photoemitter substrates 53 and 54 are each screwed to the frame 40. The LiDAR device 1 allows three-dimensional fine adjustments to the installation position and the angle of each of the light receiving element 31 and the light sources 11 and 12 by modifying the installation positions and the angles of the photoreceiver substrate 51 and the photoemitter substrates 53 and 54. In the present embodiment, the holders 421 and 431 are integrated with the frame side 42 and the frame back 43, respectively. However, the holders 421 and 431 may be integrated with the photoemitter substrate 53 and the photoemitter substrate 54.

The controller 3 is fitted to, for example, the housing 100. The controller controls the timing of light emission from the light sources 11 and 12 in synchronization with rotation of the mirror module 21 of the scanning unit 20. More specifically, the controller 3 controls the light beam from the light source 11 to be incident on the deflection mirror 211 and the light beam from the light source 12 to be incident on the deflection mirror 212.

As illustrated in FIG. 9, the light emitted from the light source 11 is incident on the reflection point P on the emitted light deflector 20a through the light projection lens 13. The light emitted from the light source 12 passes through the light projection lens 14. After that, its traveling direction is deflected substantially 90 degrees by the emitted-light turning mirror 15. The light is then incident on the reflection point P on the emitted light deflector 20a. It is noted that the light source 11 and the light source 12 use different surfaces of the emitted light deflector 20a. The light incident on the reflection point P is directed in accordance with the rotational position of the mirror module 21.

As illustrated in FIG. 10, the light reflected from a subject positioned in the predetermined direction in accordance with the rotational position of the mirror module 21 (i.e., the direction in which light is emitted from the emitted light deflector 20a) is reflected by the received light deflector 20b and detected in the light receiving element 31 through the light receiving lens 32 and the received light turning mirror 33. Note that subjects are various targets to be detected by the LiDAR device 1.

More specifically, in the LiDAR device 1, horizontal scanning in the X axis direction (hereinafter, main scanning) is mechanically achieved by rotation of the mirror module 21. Additionally, vertical scanning in the Y axis direction (hereinafter, sub-scanning) is electronically achieved by the light sources 11 and 12 for outputting four beams that are adjacent to each other in the vertical direction and the APD array 311 for receiving the four beams.

Figure 11:
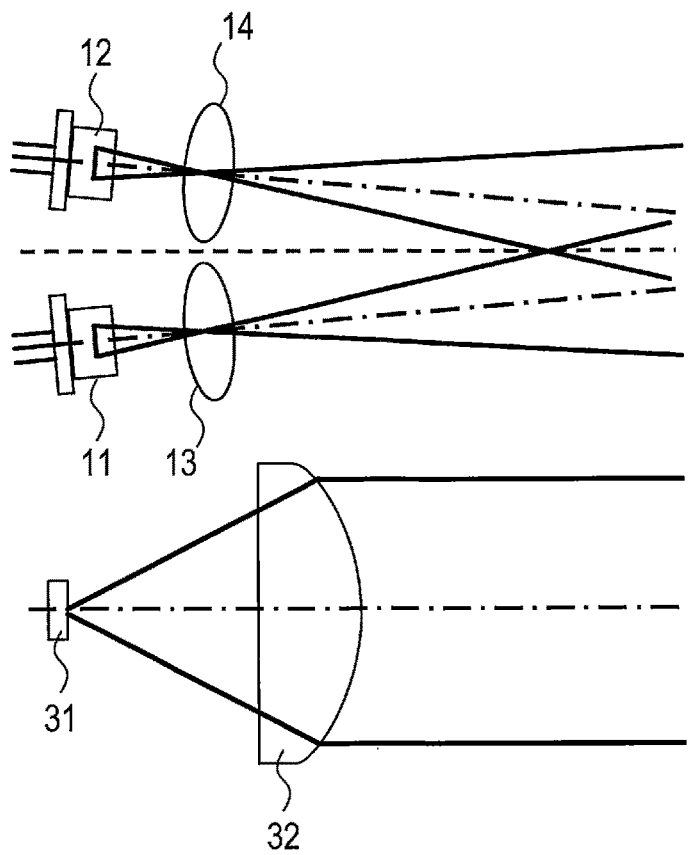
FIG. 11 illustrates positional adjustment of light sources and the light receiving element.

As illustrated in FIGS. 9 to 11, the light sources 11 and 12 are placed so that their optical paths to the reflection point P on the emitted light deflector 20a have an equal length, and their optical axes intersect at reflection point P. The light receiving element 31 is placed near the focus of the light receiving lens 32.

Figure 12:
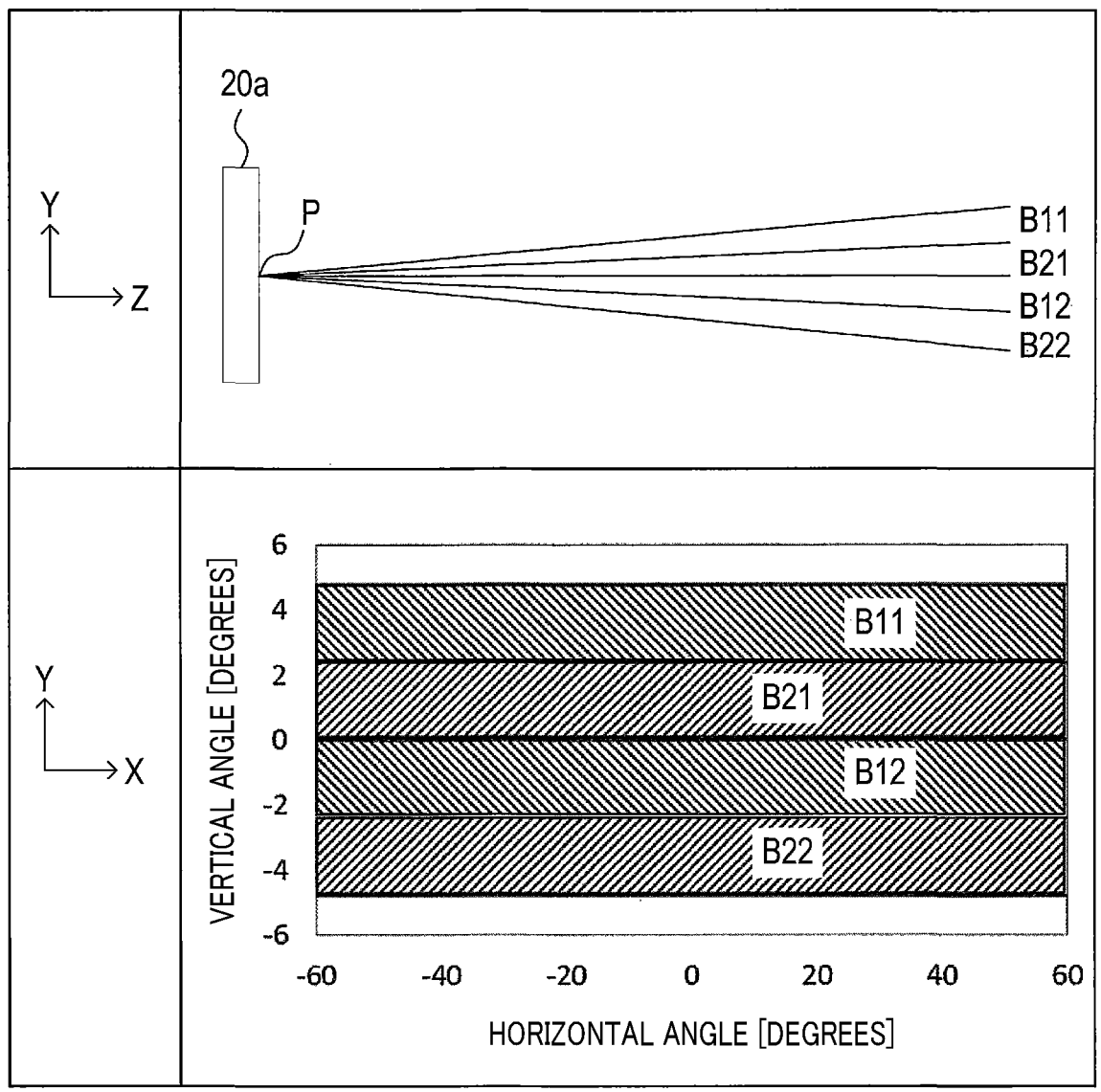
FIG. 12 illustrates an illumination region of light beams emitted from a deflection mirror.
Figure 13:
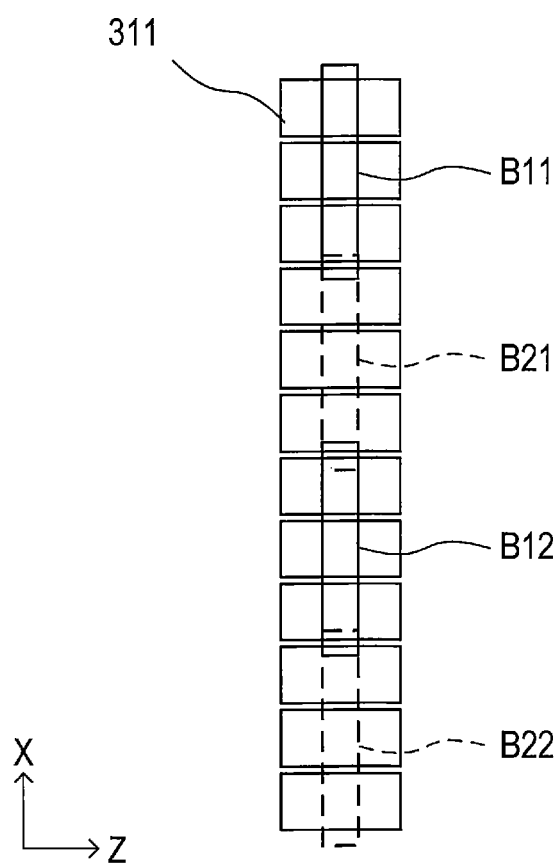
FIG. 13 illustrates a correspondence between light emitting regions of the light sources and light receiving region of the light receiving element.

Light beams from the light emitting regions A1 and A2 of the light source 11 are denoted by B11 and B12, and light beams from the light emitting regions A1 and A2 of the light source 12 are denoted by B21 and B22. As illustrated in FIG. 12, the light beams emitted from the reflection point P on the emitted light deflector 20a are the light beam B11, the light beam B21, the light beam B12, and the light beam B22 in this order from top to bottom along the Y axis. Additionally, the positions of the light sources 11 and 12 are finely adjusted so as not to form a gap between the light beams B11, B21, B12, and B22. As illustrated in FIG. 13, the positions of the light sources 11 and 12 are also finely adjusted so that the APD array 311 of the light receiving element 31 receives reflected light (hereinafter, returning light beams) from the subject irradiated with the light beams B11, B21, B12, and B22, and the returning light beams are applied to the center in the Z axis direction of each APD with each beam hitting three different elements.

The reflective surface of the emitted light deflector 20a is parallel with the rotation axis of the mirror module 21, and thus the inclination angle of the reflective surface in vertical plane including the path of light incident on the emitted light deflector 20a is unaffected by the rotational position of the mirror module 21. The vertical planes refer to planes along the Y axis. More specifically, as indicated in the graph of FIG. 12, irrespective of the emission angle in the X axis direction (i.e., the horizontal angle), which is the main scanning direction of the light emitted from the emitted light deflector 20a, the emission angle in the Y axis direction (i.e., the vertical angle), which is the sub-scanning direction, is constant. Therefore, the light beams are applied to a two-dimensionally defined, entire scan region. Hereinafter, the angle of emission in the X axis direction is referred to as a main scanning angle, and the angle of emission in the Y axis direction is referred to as a sub-scanning angle.

Process steps of a data acquisition process performed by the CPU 61 of the controller 3 will now be described. This data acquisition process is repeatedly performed during operation of the controller 3.

Figure 14:
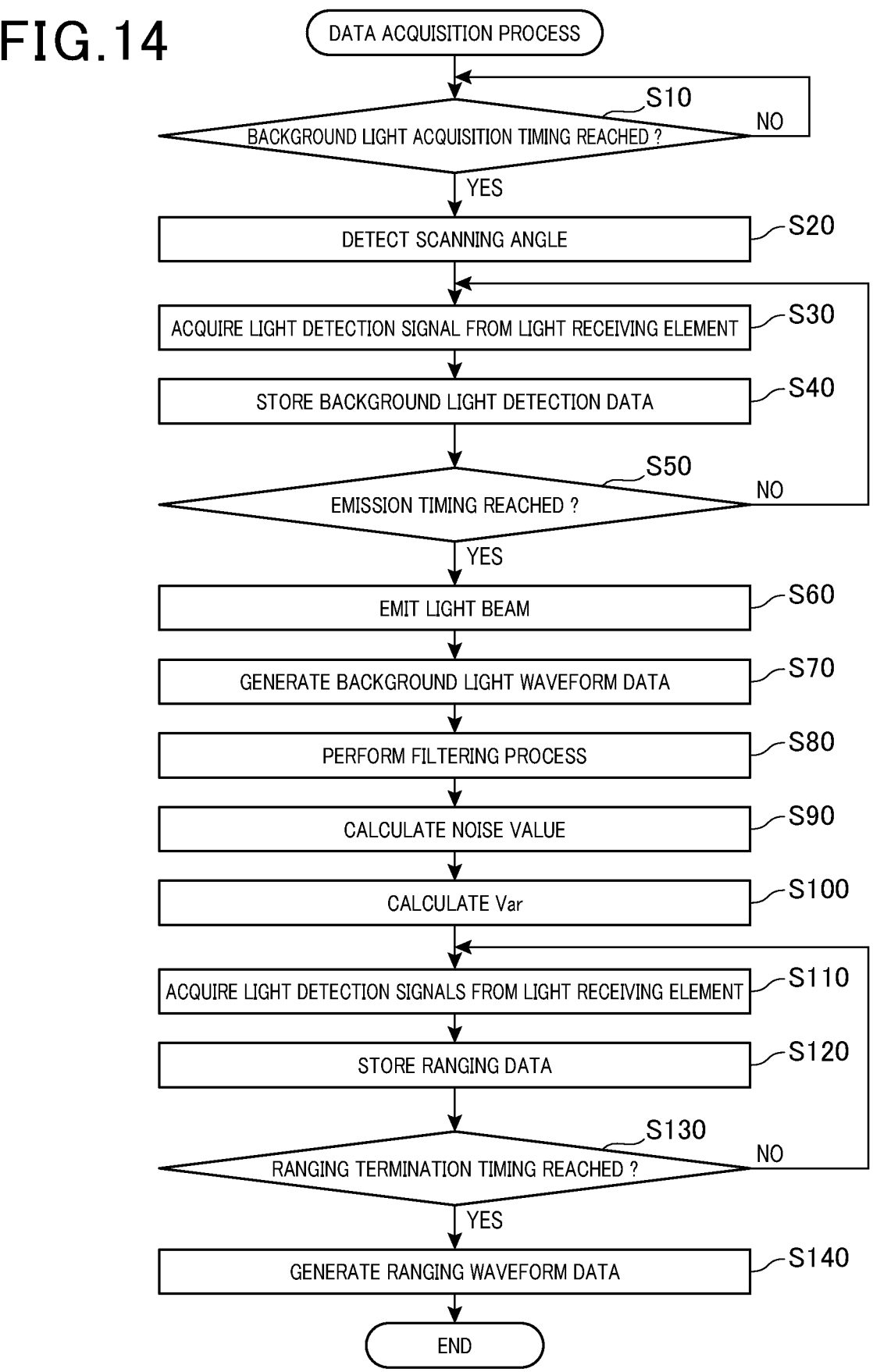
FIG. 14 is a flowchart of a data acquisition process.

Upon starting this data acquisition process, as illustrated in FIG. 14, the CPU 61, first at S10, determines whether the background light acquisition timing, which arrives every time the preset ranging cycle elapses, has been reached. If the background light acquisition timing has not been reached, the CPU 61 repeats the process step S10 and waits until the background light acquisition timing is reached. Upon the background light acquisition timing being reached, the CPU 61, at step S20, detects the rotational position (i.e., the main scanning angle) of the mirror module 21 by acquiring the scanning angle detection signal from the mirror module 21.

Then, at S30, the CPU 61 acquires the light detection signals from the light receiving element 31. At S40, the CPU 61 stores in the RAM 63 background light detection data indicating the signal intensities of the light detection signals acquired at S30.

Figure 15:
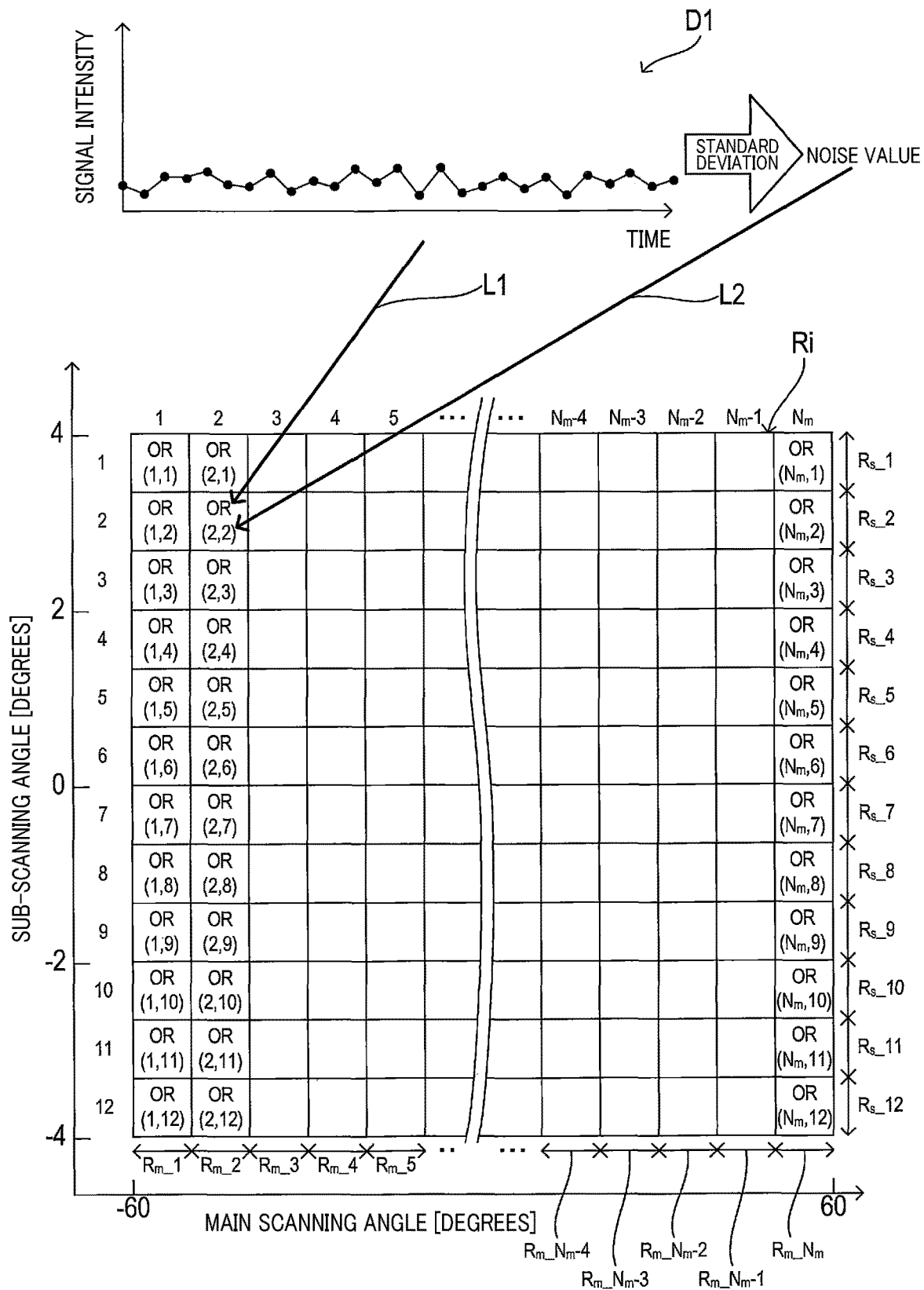
FIG. 15 illustrates a plurality of bearing regions in a two-dimensional matrix and background light waveform data.

As illustrated in FIG. 15, the CPU 61 stores the background light detection data in association with one of a plurality of bearing regions defined by dividing the light irradiated region Ri that is irradiated with the laser light into a two-dimensional matrix configured as an array of main scanning angles in rows and an array of sub-scanning angles in columns. The light irradiated region Ri in the present embodiment is a region spanning a main scanning angle range of −60 to +60 degrees and a sub-scanning angle range of −4 to +4 degrees.

The plurality of bearing regions are equally divided regions with Nm main scanning direction regions Rm along the main scanning direction and twelve sub-scanning direction regions Rs along the sub-scanning direction. The Nm main scanning direction regions Rm are respectively denoted as Rm_1, Rm_2, . . . , Rm_Nm−1, Rm_Nm, in ascending order of main scanning angles. The twelve sub-scanning direction regions Rs are respectively denoted as Rs_1, Rs_2, Rs_3, Rs_4, . . . , Rm_11, Rm_12 in descending order of sub-scanning angles. The bearing region specified by the main scanning direction region Rmi and the sub-scanning direction region Rsj is denoted as the bearing region OR(i, j), where i is an integer from 1 to Nm and j is an integer from 1 to 12.

More specifically, at S40, the CPU 61 first sets one of the Nm main scanning direction regions Rm based on the scanning angle detected at S20.

The CPU 61 stores each of the signal intensities of the light detection signals from the twelve APDs in the RAM 63 as background light detection data in association with the time when the light detection signal was acquired, the main scanning direction region Rm set above, and the sub-scanning direction region Rs set in advance for each APD (that is, in association with the time and the bearing region). The signal intensities acquired from the three APDs corresponding to the light beam B11 are respectively associated with the sub-scanning direction regions Rs_1, Rs_2, and Rs_3. Similarly, the signal intensities acquired from the three APDs corresponding to the light beam B21 are respectively associated with the sub-scanning direction regions Rs_4, Rs_5, and Rs_6. The signal intensities acquired from the three APDs corresponding to the light beam B12 are respectively associated with the sub-scanning direction regions Rs_7, Rs_8 and Rs_9. The signal intensities acquired from the three APDs corresponding to the light beam B22 are respectively associated with the sub-scanning direction regions Rs_10, Rs_11, and Rs_12.

As illustrated in FIG. 14, the CPU 61, at S50, determines whether the emission timing has been reached at which a preset background light acquisition period has elapsed from the background light acquisition timing. Here, if the emission timing has not been reached, the CPU 61 proceeds to S30. If the emission timing has been reached, the CPU 61 causes the light sources 11 and 12 to emit a light beam at S60.

Then, at S70, the CPU 61 generates twelve pieces of background light waveform data corresponding to the respective sub-scanning direction regions Rs_1, Rs_2, Rs_3, . . . , Rs_11, and Rs_12 based on the background light detection data acquired at S30 and S40, and stores them in the RAM 63. The background light waveform data indicates time variations of the signal intensity from the background light acquisition timing to the emission timing.

In each piece of the background light waveform data, the above-set main scanning direction region Rm and one of the sub-scanning direction regions Rs_1, Rs_2, Rs_3, . . . , Rs_11, and Rs_12 are set. Therefore, as indicated by the arrow L1 in FIG. 15, each piece of the background light waveform data D1 is stored in the RAM 63, in association with the bearing region.

As illustrated in FIG. 14, the CPU 61, at S80, performs a filtering process on the background light waveform data generated at S70. In the present embodiment, the CPU 61 performs the filtering process using a bilateral filter. The bilateral filter is a filter that preserves and smooths edges.

At S90, the CPU 61 calculates a noise value of the background light waveform data on which the filtering process was performed at S80, and stores the noise value in the RAM 63. The noise value is the standard deviation of the signal intensities in the background light waveform data, as illustrated in FIG. 15. As described above, each piece of the background light waveform data has the above-set main scanning direction region Rm and one of the sub-scanning direction regions Rs_1, Rs_2, Rs_3, . . . , Rs_11, and Rs_12. Therefore, the noise value is stored in the RAM 63, in association with the bearing region, as indicated by the arrow L2 in FIG. 15.

Subsequently, the CPU 61 calculates the all-bearing standard deviation Var at S100, as illustrated in FIG. 14. The all-bearing standard deviation Var is the standard deviation of the noise values in all the respective bearing regions OR(i, j). However, the CPU 61 does not calculate the all-bearing standard deviation Var in cases where the noise value is not stored in the RAM 63 in at least one of all of the bearing regions OR(i, j).

Subsequently, the CPU 61 acquires, at S110, the light detection signals from the light receiving element 31. Further, at S120, the CPU 61 stores in the RAM 63 ranging data indicating the signal intensities of the light detection signals acquired at S110.

More specifically, at S120, the CPU 61 first sets one of the Nm main scanning direction regions Rm based on the scanning angle detected at S20.

Then, in the same manner as at S40, the CPU 61 stores each of the signal intensities of the light detection signals from the twelve APDs in the RAM 63 as ranging data in association with the time when the light detection signal was acquired, the main scanning direction region Rm set above, and the sub-scanning direction region Rs set in advance for each APD (that is, in association with the time and the bearing region).

Subsequently, at S130, the CPU 61 determines whether the ranging termination timing at which a preset ranging period has elapsed from the emission timing has been reached. If the ranging termination timing has not been reached, the CPU 61 proceeds to S110. If the ranging termination timing has been reached, then at S140 the CPU 61 generates twelve pieces of ranging waveform data corresponding to the respective sub-scanning direction regions Rs_1, Rs_2, Rs_3, . . . , Rs_11, and Rs_12 based on the ranging data acquired at S110 and S120, and stores them in the RAM 63. The ranging waveform data indicates time variations of the signal intensity from the emission timing to the ranging termination timing.

Figure 16:
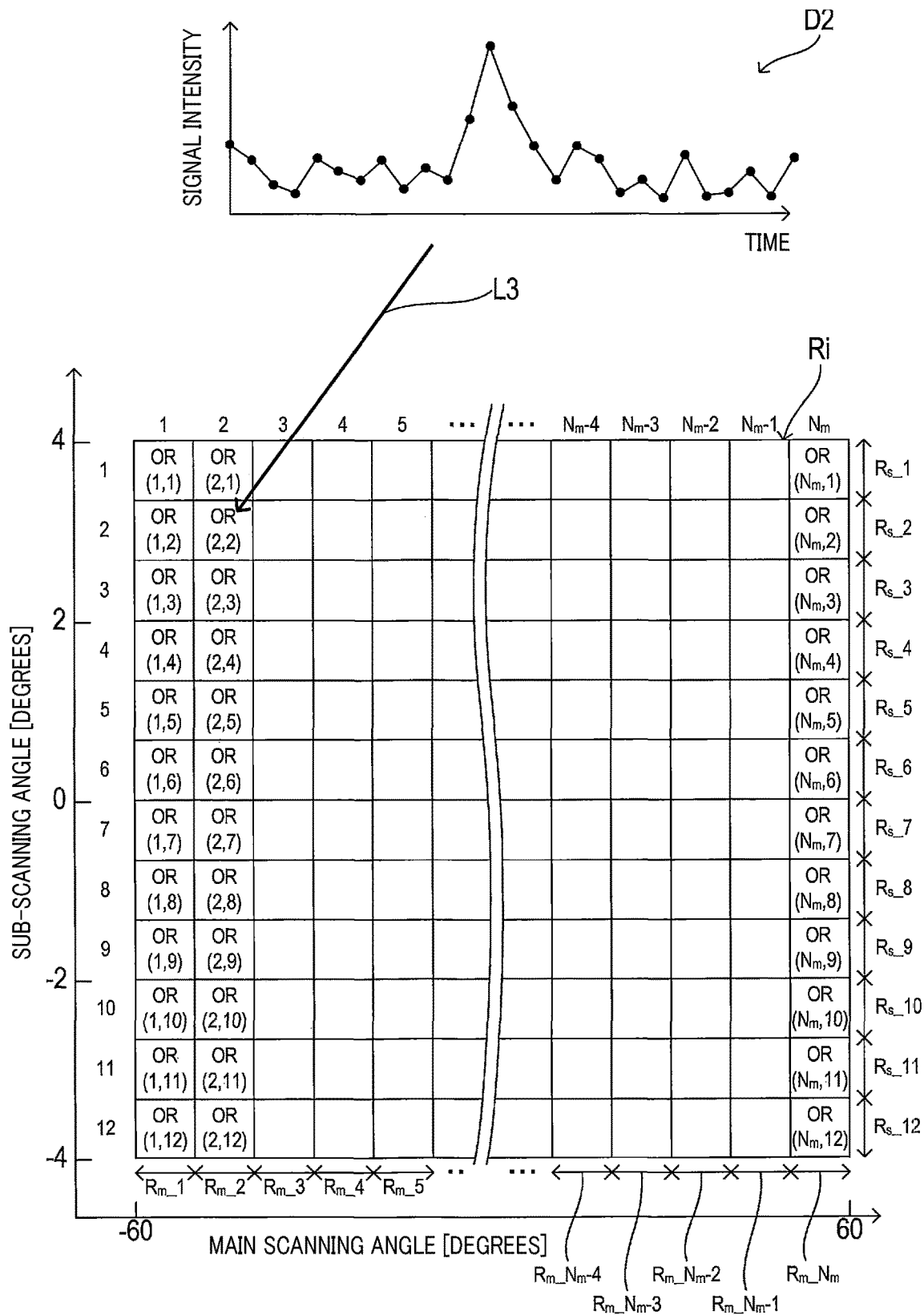
FIG. 16 illustrates a plurality of bearing regions in a two-dimensional matrix and ranging waveform data.

Then, in the ranging waveform data, the above-set main scanning direction region Rm and one of the sub-scanning direction regions Rs_1, Rs_2, Rs_3, ..., Rs_11, Rs_12 are set. Therefore, as illustrated by the arrow L3 in FIG. 16, the ranging waveform data D2 is stored in the RAM 63 in association with the bearing region.

Upon completion of process step S140, the CPU 61 ends the data acquisition process.

An integration ranging process performed by the CPU 61 of the controller 3 will now be described. The integration ranging process is repeatedly performed during operation of the controller 3.

Figure 17:
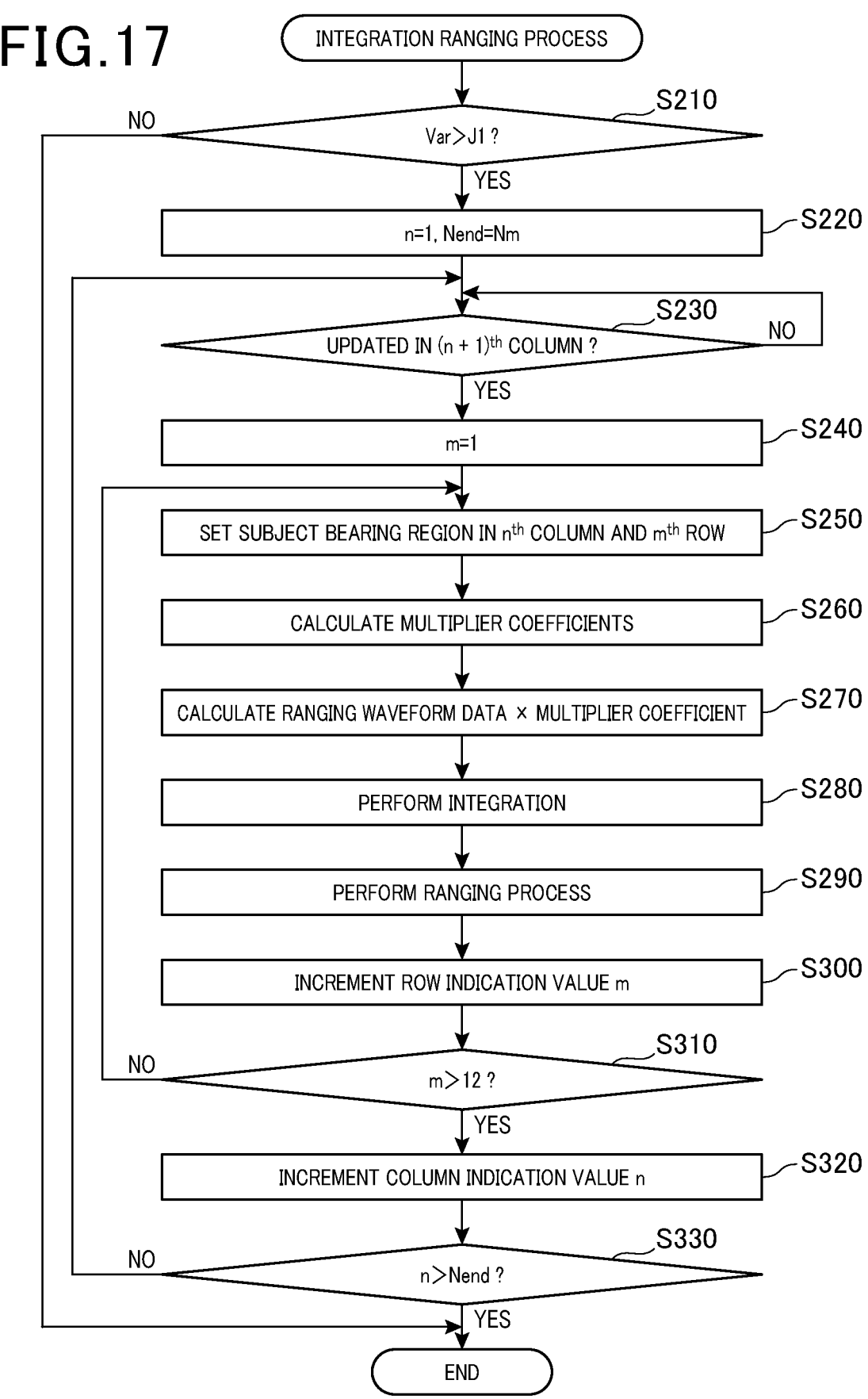
FIG. 17 is a flowchart of an integration ranging process of the first embodiment.

Upon initiation of the integration ranging process as illustrated in FIG. 17, the CPU 61, at S210, determines whether the latest all-bearing standard deviation Var calculated at S100 is greater than a preset ranging determination value J1. If the all-bearing standard deviation Var is equal to or less than the ranging determination value J1, the CPU 61 ends the integration ranging process.

If the all-bearing standard deviation Var is greater than the ranging determination value J1, the CPU 61 sets the column indication value n in the RAM 63 to 1 and sets the end column indication value Nend in the RAM 63 to Nm at S220. Hereafter, each of the bearing region OR(n, 1), the bearing region OR(n, 2), the bearing region OR(n, 3), and the bearing region OR(n, 4) is referred to as the bearing region in the $n^{th}$ column.

Then, at S230, the CPU 61 determines whether the background light waveform data associated with the bearing regions in the $(n+1)^{th}$ column has been updated since the previous cycle of the integration ranging process. If the background light waveform data associated with the bearing regions in the $(n+1)^{th}$ column has not been updated, the CPU 61 waits until the background light waveform data is updated by repeating the process step S230. If the background light waveform data is updated, the CPU 61 sets the row indication value m in the RAM 63 to 1 at S240. Hereafter, the bearing region OR(n, m) is referred to as the bearing region in the $n^{th}$ column and $m^{th}$ row.

Figure 18:
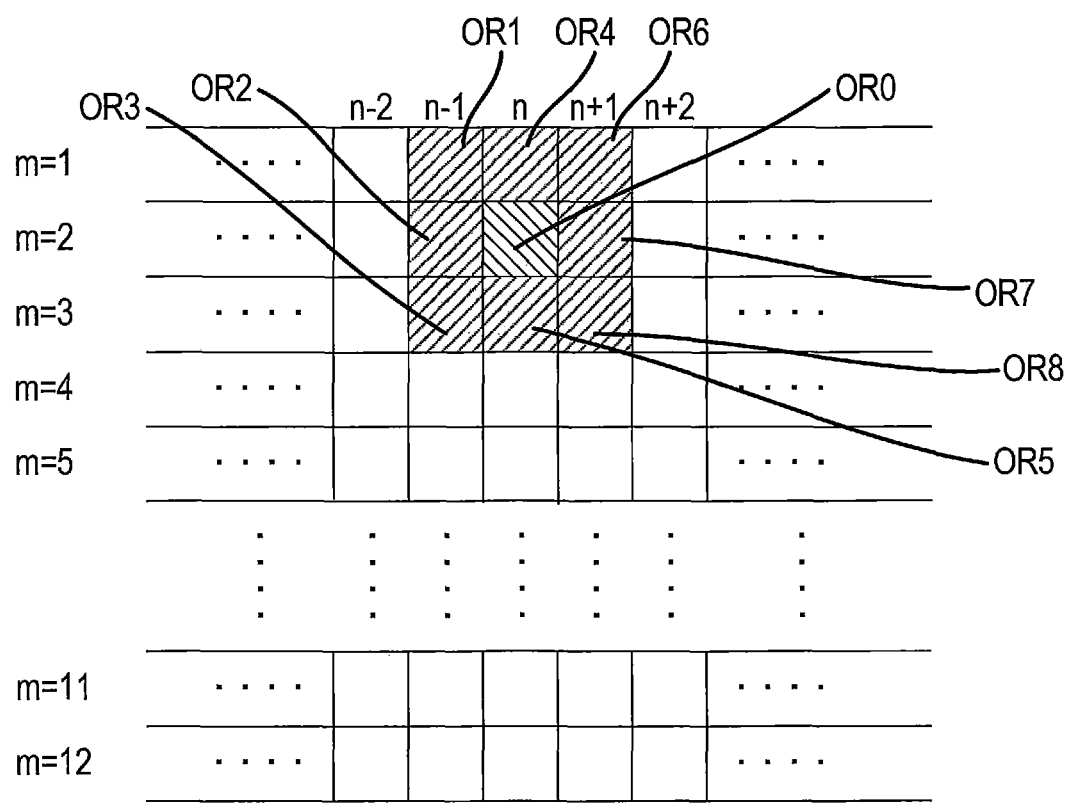
FIG. 18 illustrates subject and adjacent bearing regions.

Subsequently, at S250, the CPU 61 sets the subject bearing region in the $n^{th}$ column and $m^{th}$ row. At S260, the CPU 61 calculates the multiplier coefficient using the noise value calculated at S90 for each of the subject bearing region and adjacent bearing regions adjacent to the subject bearing region. The subject bearing region is the bearing region OR(n, m). The adjacent bearing regions are the bearing region OR(n−1, m−1), the bearing region OR(n−1, m), the bearing region OR(n−1, m+1), the bearing region OR(n, m−1), the bearing region OR(n, m+1), the bearing region OR(n+1, m−1), the bearing region OR(n+1, m) and the bearing region OR(n+1, m+1). For example, as illustrated in FIG. 18, when the subject bearing region is in the $n^{th}$ column and second row, the subject bearing region is the bearing region OR0, and the adjacent bearing regions are the bearing regions OR1, OR2, OR3, OR4, OR5, OR6, OR7, and OR8.

Hereinafter, the bearing region OR(n−1, m−1) is referred to as the first adjacent orientation. The bearing region OR(n−1, m) is referred to as the second adjacent bearing region. The bearing region OR(n−1, m+1) is referred to the third adjacent bearing region. The bearing region OR(n, m−1) is referred to the fourth adjacent bearing region. The bearing region OR(n, m+1) is referred to the fifth adjacent bearing region. The bearing region OR(n+1, m−1) is referred to the sixth adjacent bearing region. The bearing region OR(n+1, m) is referred to the seventh adjacent bearing region. The bearing region OR(n+1, m+1) is referred to the eighth adjacent bearing region.

Figure 19:
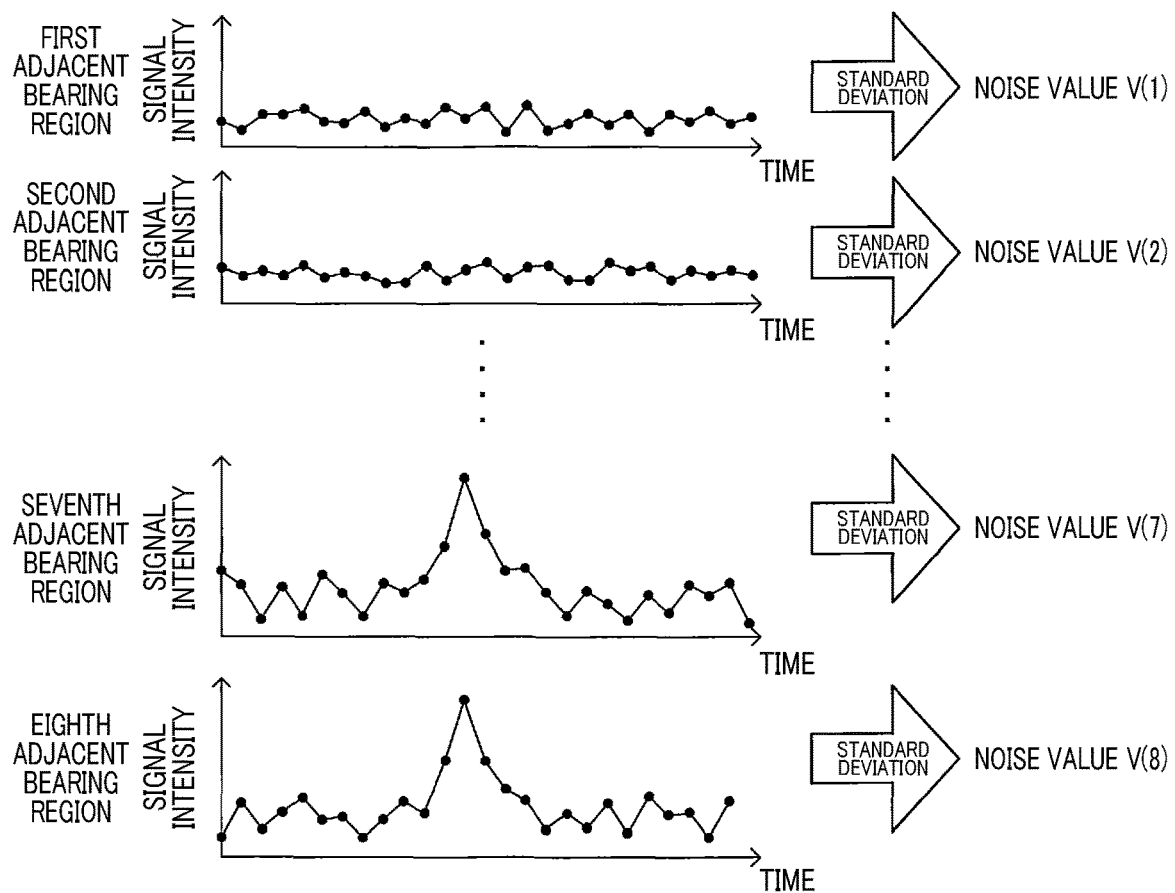
FIG. 19 illustrates a method of calculating noise values.

More specifically, at S260, the CPU 61 calculates the multiplier coefficient W(0) for the subject bearing region and the multiplier coefficient W(k) for the kth adjacent bearing region according to the relational expression (1) below, where the noise value for the subject bearing region is Vn(0) and the noise value for the kth adjacent bearing region is Vn(k) as illustrated in FIG. 19. σ in the relational expression (1) below is the standard deviation of the normal distribution. σ has a preset value.

$$W(k)=\exp\{(Vn(0)-Vn(k))^2/2\sigma^2\} \quad (1)$$

The graph G1 in FIG. 20 is a specific example of the relational expression (1). (Vn(0)−Vn(k)) in the relational expression (1) corresponds to a noise value difference on the horizontal axis of graph G1.

The matrix M1 in FIG. 20 is a specific example of the multiplier coefficients for the subject bearing region and the first through eighth adjacent bearing regions. The matrix M1 shows that the multiplier coefficient for the subject bearing region is 1, the multiplier coefficient for each of the first through third adjacent bearing regions is 0.1, the multiplier coefficient for each of the fourth, fifth, and seventh adjacent bearing regions is 0.6, and the multiplier coefficient for each of the sixth and eighth adjacent bearing regions is 0.9.

Further, as illustrated in FIG. 17, at S270, the CPU 61 multiplies the signal intensity of the ranging waveform data for each of the subject bearing region and the first to eighth adjacent bearing regions by the multiplier coefficient calculated at S260. That is, the CPU 61 multiplies the signal intensity of the ranging waveform data for the kth adjacent bearing region by the multiplier coefficient W(k). The data acquired by multiplying the signal intensity of the ranging waveform data by the multiplier coefficient is hereinafter referred to as coefficient-multiplied waveform data.

Figure 21:
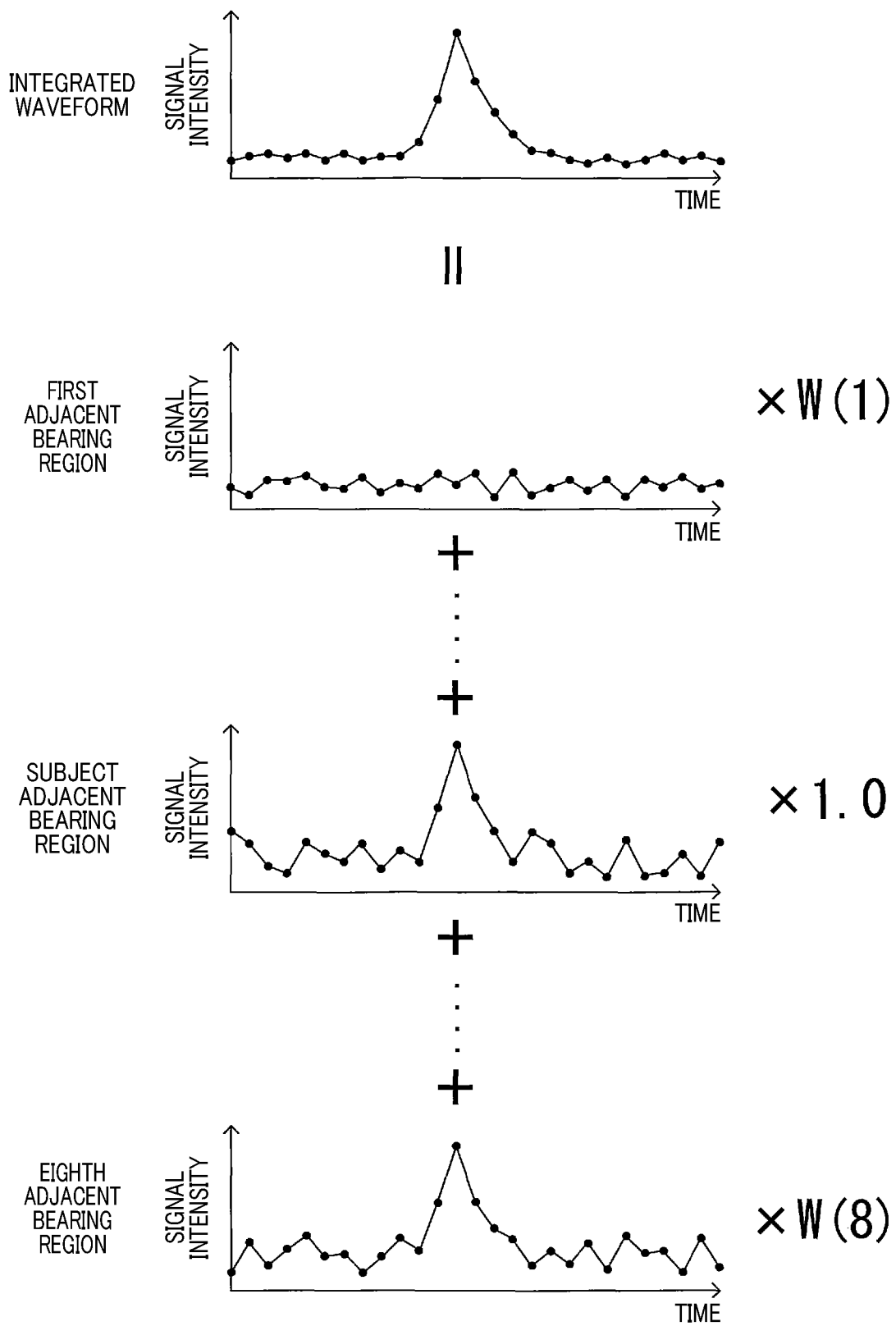
FIG. 21 illustrates a method of calculating integrated waveform data.

At S280, the CPU 61 integrates the coefficient-multiplied waveform data for the subject bearing region and the first to eighth adjacent bearing regions. The data acquired by integrating the coefficient-multiplied waveform data for the subject bearing region and the first to eighth adjacent bearing regions is hereinafter referred to as integrated waveform data. FIG. 21 shows that the integrated waveform data is acquired by integrating the ranging waveform data for the subject bearing region and the first to eighth adjacent bearing regions multiplied by their respective multiplier coefficients.

Then, at S290 as illustrated in FIG. 17, the CPU 61 performs a ranging process to measure a distance to the object reflecting the light beam by using the integrated waveform data acquired at S280 to calculate a time from emission of the light beam to detection of the light beam by the light receiving element 31.

Subsequently, the CPU 61 increments (i.e., adds one to) the row indication value m at S300. Then, at S310, the CPU 61 determines whether the row indication value m is greater than twelve. If the row indication value m is equal to or less than twelve, the CPU 61 proceeds to S250. If the row indication value m is greater than twelve, the CPU 61 increments the column indication value n at S320. Then, at S330, the CPU 61 determines whether the column indication value n is greater than the end column indication value Nend. If the column indication value n is equal to or less than the end column indication value Nend, the CPU 61 proceeds to S230. If the column indication value n is greater than the end column indication value Nend, the CPU 61 ends the integration ranging process.

The LiDAR device 1 thus configured includes the light projecting unit 10 and the scanning unit 20, the light receiving unit 30, and the controller 3.

The light projecting unit 10 and the scanning unit 20 emit the laser light. The light receiving unit 30 detects the reflected laser light.

For each of the plurality of bearing regions OR(i, j) formed by dividing the light irradiated region Ri, the controller 3 calculates a noise value associated with the level of background light arriving from the bearing region OR(i, j) based on the result of detection by the light receiving unit 30.

The controller 3 sequentially selects one of the plurality of bearing regions OR(i, j) as the subject bearing region.

The controller 3 calculates the multiplier coefficient for each of the subject bearing region and the plurality of adjacent bearing regions such that the multiplier coefficient for each of the adjacent bearing regions is negatively correlated with the difference in noise value between the subject bearing region and the adjacent bearing region. The term "negatively correlated with the difference in noise value" not only means that the multiplier coefficient continuously decreases with increasing difference in noise value, but may mean that the multiplier coefficient stepwise decreases with increasing difference in noise value.

The controller 3 generates ranging waveform data for each of the plurality of bearing regions OR (i, j), which indicates time variations of the signal intensity from the time when the laser light is emitted to the time when a preset ranging period elapses.

For the ranging waveform data for each of the subject bearing region and the plurality of adjacent bearing regions, the controller 3 generates the coefficient-multiplied waveform data by multiplying the ranging waveform data by the corresponding multiplier coefficient.

The controller 3 generates the integrated waveform data by integrating the coefficient-multiplied waveform data for the subject bearing region and the plurality of adjacent bearing regions.

The controller 3 uses the integrated waveform data to measure the distance to the object that reflected the laser light.

In this way, the LiDAR device 1 can reduce randomly generated noise in the integrated waveform data. This is because the LiDAR device 1 integrates the coefficient-multiplied waveform data for the subject bearing region and the plurality of adjacent bearing regions to measure the distance to the object existing in the bearing direction corresponding to the subject bearing region.

Further, the LiDAR device 1 calculates the multiplier coefficients for the subject bearing region and the plurality of adjacent bearing regions such that the multiplier coefficient for each of the plurality of adjacent bearing regions is negatively correlated with the difference in noise value between the subject bearing region and the adjacent bearing region, and generates the coefficient-multiplied waveform data for each of the subject bearing region and the plurality of adjacent bearing regions by multiplying the ranging waveform data by the corresponding multiplier coefficient. In cases where background light levels for the adjacent bearing regions are higher than the background light level for the subject bearing region, this allows the LiDAR device 1 to reduce the contribution of the ranging waveform data for the adjacent bearing regions in the integrated waveform data. Therefore, in cases where background light levels for the adjacent bearing regions are higher than the background light level for the subject bearing region, the LiDAR device 1 can suppress occurrence of a situation where the integrated waveform data becomes noisier than the ranging waveform data for the subject bearing region, and can further reduce the noise in the integrated waveform data.

As described above, the LiDAR device 1 can improve the detection sensitivity of detecting the reflected laser light at the light receiving unit 30.

The controller 3 also calculates the all-bearing standard deviation Var related to the standard deviation of the background light levels over the entire light irradiated region Ri. The controller 3 prohibits execution of the process steps S220 to S350 from being performed in cases where the all-bearing standard deviation Var is equal to or less than the predefined ranging determination value J1. That is, the LiDAR device 1 can prohibit generation of the integrated waveform data in situations where there is little background light, for example, at night or in a tunnel, and thus the multiplier coefficients for the adjacent bearing regions can not be properly calculated. This allows the controller 3 to inhibit the reduction in the accuracy of measurement of the distance to the object reflecting the laser light.

For each of the plurality of bearing regions OR(i, j), the controller 3 generates, based on the result of detection by the light receiving unit 30, the background light waveform data indicating time variations of the signal intensity within a background light acquisition period set so as not to overlap with the ranging period. Further, the controller 3 performs the filtering process on the background light waveform data for each of the plurality of bearing regions OR(i, j). Then, the controller 3 calculates the noise value using the filtered background light waveform data for each of the plurality of bearing regions OR(i, j).

This allows the LiDAR device 1 to suppress the noise of the background light in the background light waveform data, thereby further improving the detection sensitivity of the reflected laser light at the light receiving unit 30.

The controller 3 calculates the noise values based on the result of detection by the light receiving unit 30 immediately prior to the start of the ranging period. This allows the LiDAR device 1 to simplify the configuration of the LiDAR device 1, since the background light can be detected by the light receiving unit 30 without separately installing a sensor for detecting the background light.

In the above-described embodiment, the LiDAR device 1 corresponds to a ranging device, a combination of the light projecting unit 10 and the scanning unit 20 correspond to a light emitting unit, the light receiving unit 30 corresponds to a light detection unit. The process step S90 corresponds to a process performed by a background light calculation unit 601 (see FIG. 1B).

The process steps S220, S240, S250, S300 to S330 correspond to processes performed by a subject bearing-azimuth selection unit 602 (see FIG. 1B). The process step S260 corresponds to a process performed by a coefficient calculation unit 603 (see FIG. 1B). The process steps S20 and S110 to S140 correspond to processes performed by a ranging waveform generation unit 604 (see FIG. 1B). The process step S270 corresponds to a process performed by a coefficient-multiplied waveform generation unit 605 (see FIG. 1B).

The process step S280 corresponds to a process performed by an integrated waveform generation unit 606 (see FIG. 1B). The process step S290 corresponds to a process performed by a measurement unit 607 (see FIG. 1B).

The noise value corresponds to a background light level parameter, the adjacent bearing regions correspond to the peripheral bearing regions, and the signal intensity corresponds to a light detection parameter.

The process step S100 corresponds to a process performed by a standard deviation calculation unit 608 (see FIG. 1B). The process step S210 corresponds to a process performed by a deviation prohibition unit 609 (see FIG. 1B). The all-bearing standard deviation Var corresponds to a standard deviation parameter, and the ranging determination value J1 corresponds to a deviation determination value.

The process steps S10 to S50, and S70 correspond to processes performed by a background light waveform generation unit 610 (see FIG. 1B), and the process step S80 corresponds to a process performed by a filtering unit 611 (see FIG. 1B).

Second Embodiment

A second embodiment of the present disclosure will now be described with reference to the accompanying drawings. In the second embodiment, only parts different from those of the first embodiment will be described. The same reference numerals are assigned to the common components.

The second embodiment of the LiDAR device 1 differs from the first embodiment in that the integration ranging process is modified.

The integration ranging process of the second embodiment differs from that of the first embodiment in that the process step S210 is removed and the process step S212 is added instead.

Figure 22:
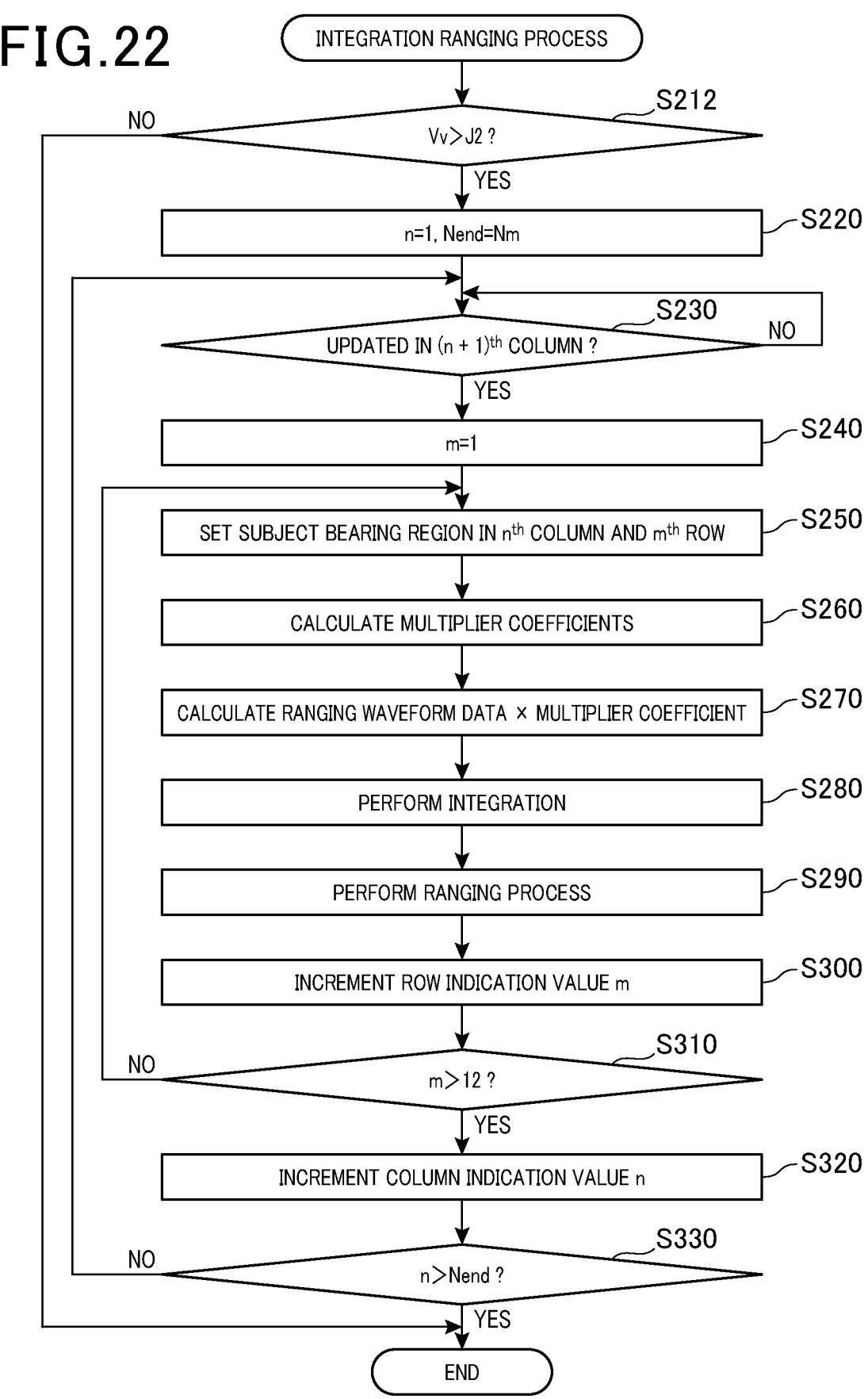
FIG. 22 is a flowchart of an integration ranging process of a second embodiment.

That is, upon initiation of the integration ranging process as illustrated in FIG. 22, the CPU 61, at step S212, determines whether the vehicle speed Vv indicated by the latest vehicle speed detection signal acquired from the vehicle speed sensor 71 is higher than a preset ranging determination value J2 (in the present embodiment, for example, 60 km/h). If the vehicle speed Vv is equal to or lower than the ranging determination value J2, the CPU 61 ends the integration ranging process. If the vehicle speed Vv is higher than the ranging determination value J2, the CPU 61 proceeds to S220.

In the LiDAR device 1 thus configured, the controller 3 determines whether the vehicle speed vV of the own vehicle is equal to or lower than the ranging determination value J2. If the controller 3 determines that the vehicle speed vV is equal to or lower than the ranging determination value J2, the controller 3 prohibits execution of the process steps S220 to S350 from being performed. That is, the LiDAR device 1 performs generation of the integrated waveform data only during high speed running.

This allows the LiDAR device 1 to prohibit measurement of distances based on the integrated waveform data in situations where it is necessary to measure distances to complex and detailed structures (e.g., roadside objects such as guardrails, or pedestrians) located near the own vehicle. For complex and detailed structures located near the own vehicle, it may not be possible to properly calculate the multiplier coefficients for the adjacent bearing regions. Therefore, the LiDAR device 1 can inhibit the reduction in the measurement accuracy when measuring distances to objects located near the own vehicle.

In the above-described embodiment, the process step S212 corresponds to a process performed by a vehicle speed determination unit 612 (see FIG. 1B) and a vehicle speed prohibition unit 613 (see FIG. 1B). The vehicle speed Vv corresponds to a travel speed, and the ranging determination value J2 corresponds to a vehicle speed determination value.

Third Embodiment

A third embodiment of the present disclosure will now be described with reference to the accompanying drawings. In the third embodiment, only parts different from those of the first embodiment will be described. The same reference numerals are assigned to the common components.

The third embodiment of the LiDAR device 1 differs from the first embodiment in that the integration ranging process is modified.

The integration ranging process of the third embodiment differs from that of the first embodiment in that the process step S210 is removed and the process steps S214, S216 and S218 are added instead.

Figure 23:
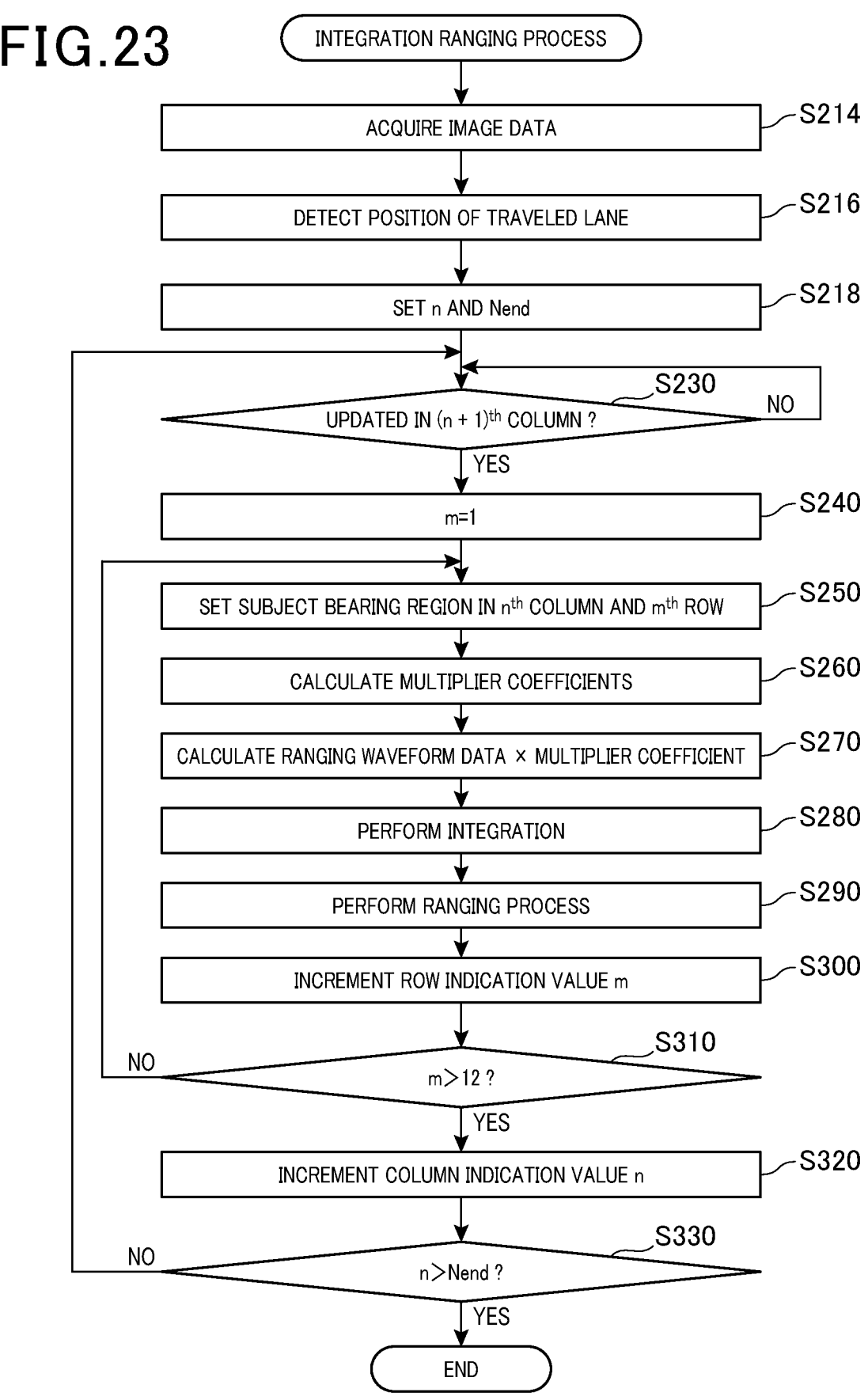
FIG. 23 is a flowchart of an integration ranging process of a third embodiment.

That is, upon initiation of the integration ranging process of the third embodiment as illustrated in FIG. 23, the CPU 61, at S214, acquires image data from the front-view camera 72. Subsequently, at S216, the CPU 61 detects the left and right boundary positions of the lane in which the own vehicle is traveling (hereinafter referred to as the own-vehicle traveled lane) by performing an image recognition process using the image data acquired at S214. For example, the boundary positions of the own-vehicle traveled lane may be detected by identifying white lines of the lane via the image recognition process.

Then, at S218, the CPU 61 sets the column indication value n based on the left boundary position of the own-vehicle traveled lane, sets the end column indication value Nend based on the right boundary position of the own-vehicle traveled lane, and proceeds to S230. More specifically, the CPU 61 sets the column indication value n, for example, by referring to a left side setting map in which a correspondence relationship between the left boundary position and the column indication value n is preset. The CPU 61 sets the end column indication value Nend, for example, by referring to a right side setting map in which a correspondence relationship between the right boundary position and the end column indication value Nend is preset.

In the LiDAR device 1 thus configured, the controller 3 detects the position of the lane in which the vehicle is traveling. Then, the controller 3 selects the bearing region OR(i, j) where the traveled lane is positioned, as the subject bearing region, among the plurality of bearing regions OR (i, j). This allows the LiDAR device 1 to reduce the number of subject bearing regions for generating the integrated waveform data, thereby reducing the processing load of the controller 3.

In the above-described embodiment, the process steps S214 and S216 correspond to a process performed by a lane detection unit 614 (see FIG. 1B), and the process steps S218, S240, S250, S300 to S330 correspond to a process performed by the subject bearing-azimuth selection unit 602 (see FIG. 1B).

Fourth Embodiment

A fourth embodiment of the present disclosure will now be described with reference to the accompanying drawings. In the fourth embodiment, only parts different from those of the first embodiment will be described. The same reference numerals are assigned to the common components.

The fourth embodiment of the LiDAR device 1 differs from the first embodiment in that the integration ranging process is modified.

The integration ranging process of the fourth embodiment differs from that of the first embodiment in that the process steps S210 and S220 are removed and the process steps S222 and S224 are added instead.

Figure 24:
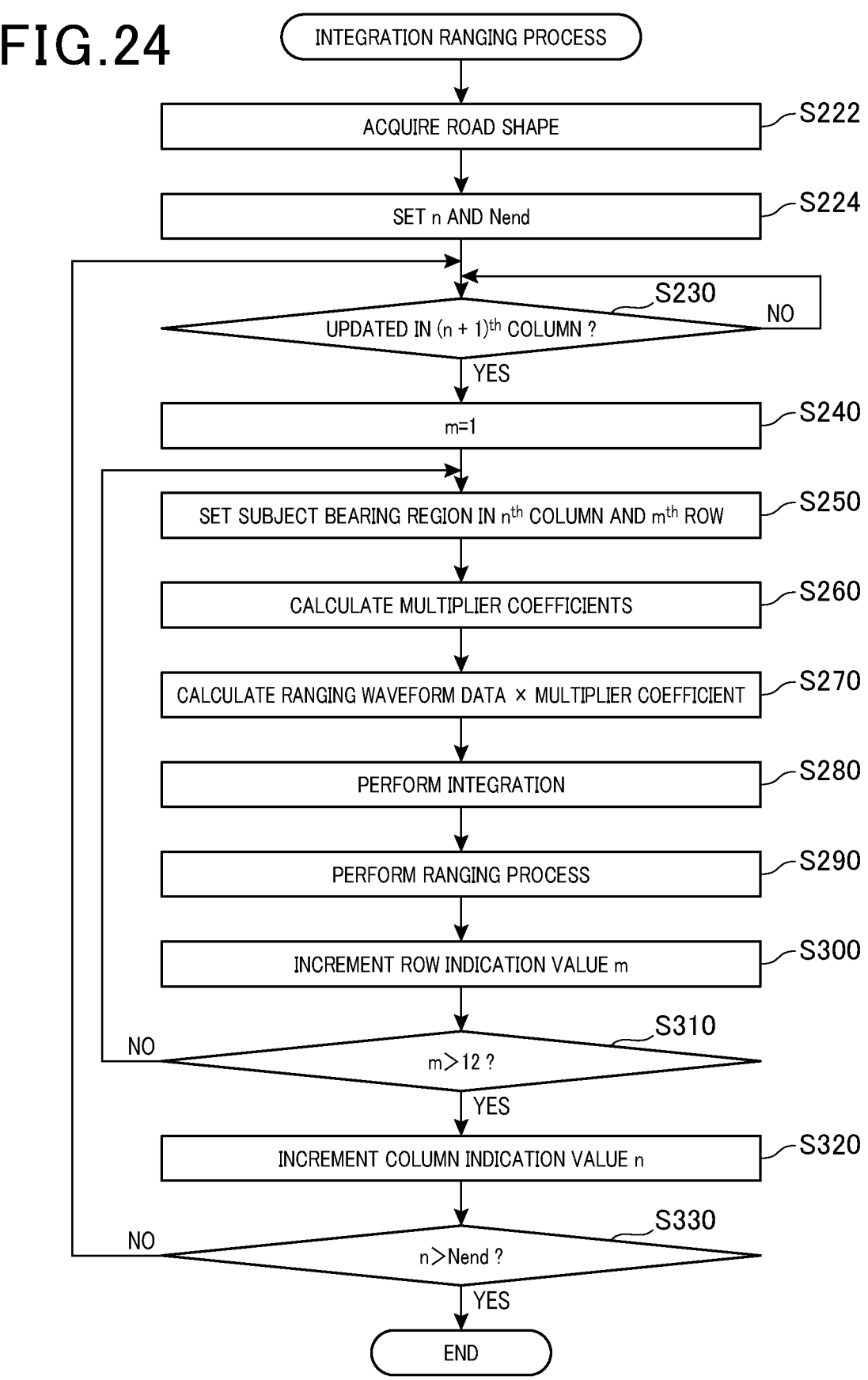
FIG. 24 is a flowchart of an integration ranging process of a fourth embodiment.

That is, upon initiation of the integration ranging process of the fourth embodiment as illustrated in FIG. 24, the CPU 61, at step S222, acquires road map data indicating a road shape ahead of the own vehicle from the navigation device 73.

Then, at S224, the CPU 61 sets the column indication value n and the end column indication value Nend based on the road shape indicated by the road map data acquired at S222. More specifically, the CPU 61 sets the column indication value n and the end column indication value Nend such that, in cases where the road ahead of the own vehicle is straight, the average of the column indication value n and the end column indication value Nend corresponds to the scanning angle of 0°. In cases where the road ahead of the vehicle curves to the left, the CPU 61 decreases the column indication value n and the end column indication value Nend as the curvature of the curve to the left increases. In addition, in cases where the road ahead of the vehicle curves to the right, the CPU 61 increases the column indication value n and the end column indication value Nend as the curvature of the curve to the right increases.

In the LiDAR device 1 thus configured, the controller 3 acquires road map data indicating the shape of the road ahead of the vehicle. Then, based on the acquired road map data, the controller 3 selects, among the plurality of bearing regions OR(i, j), the bearing region OR(i, j) where the road ahead of the own vehicle is positioned as the subject bearing region. This allows the LiDAR device 1 to reduce the number of subject bearing regions for generating the integrated waveform data, thereby reducing the processing load of the controller 3.

In the above-described embodiment, the process step S222 corresponds to a process performed by a road shape acquisition unit 615 (see FIG. 1B), and the process steps S224, S240, S250, S300 to S330 correspond to a process performed by the subject bearing-azimuth selection unit 602 (see FIG. 1B).

Fifth Embodiment

A fifth embodiment of the present disclosure will now be described with reference to the accompanying drawings. In the fifth embodiment, only parts different from those of the first embodiment will be described. The same reference numerals are assigned to the common components.

The fifth embodiment of the LiDAR device 1 differs from the first embodiment in that the integration ranging process is modified.

The integration ranging process of the fifth embodiment differs from that of the first embodiment in that the process step S252 is added.

Figure 25:
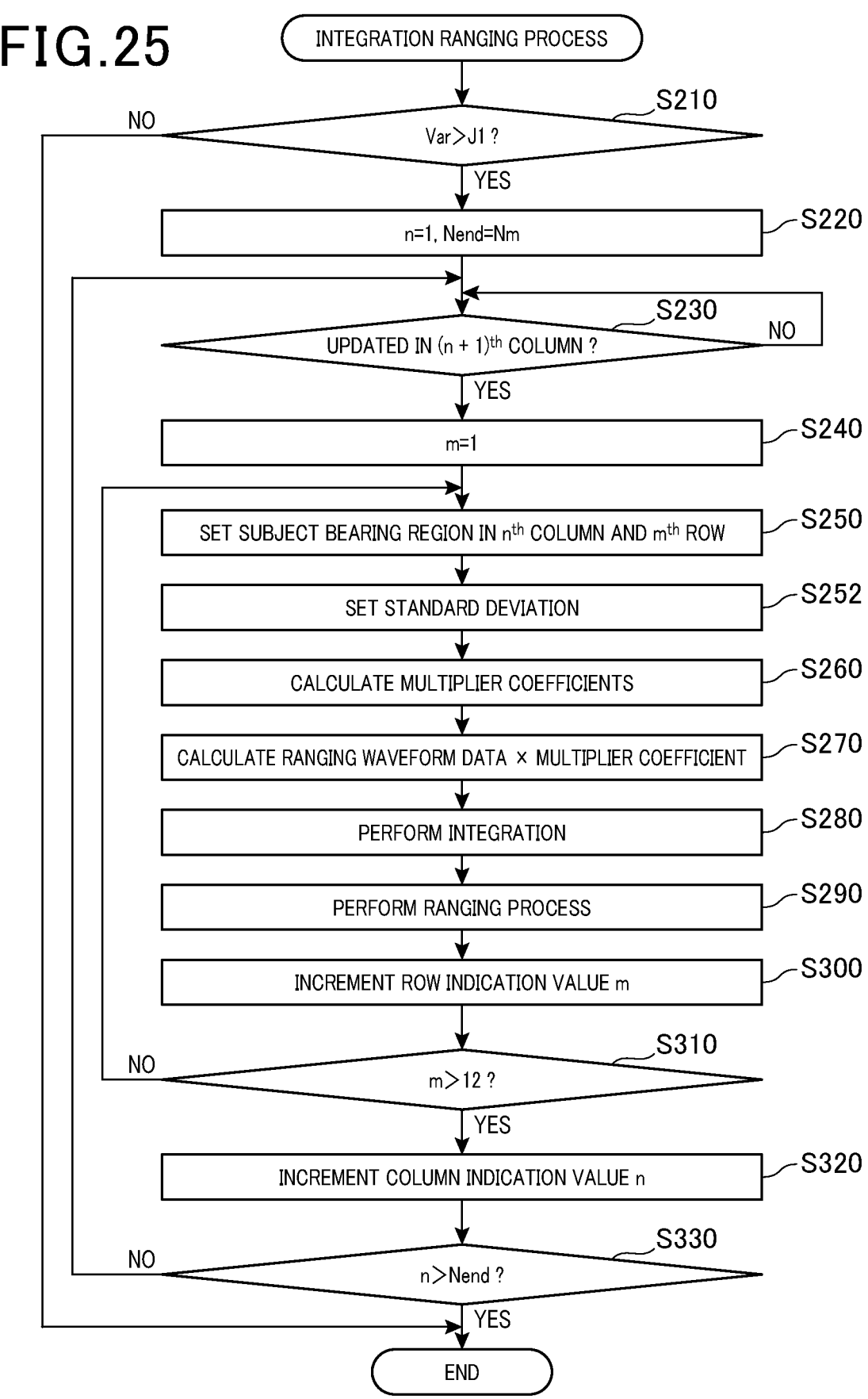
FIG. 25 is a flowchart of an integration ranging process of a fifth embodiment.
Figure 26:
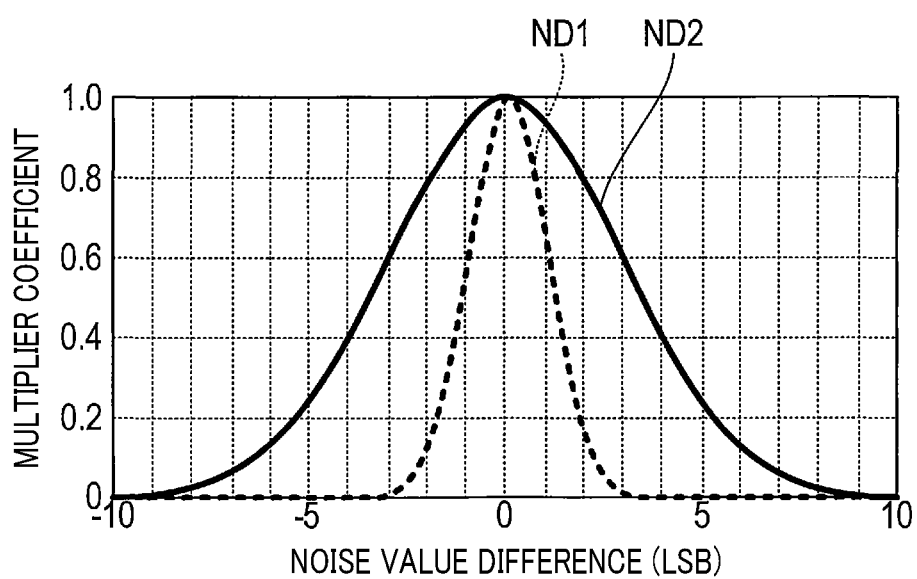
FIG. 26 illustrates a normal distribution with a low light level standard deviation and a normal distribution with a high light level standard deviation.

That is, as illustrated in FIG. 25, upon completion of the process step S250, the CPU 61, at S252, sets the standard deviation σ of the normal distribution represented by the above relational expression (1) based on the noise value for the subject bearing region calculated at S90, and proceeds to S260. In the present embodiment, more specifically, the CPU 61 sets the standard deviation σ to a preset low light level standard deviation σ1 when the noise value for the subject bearing region is equal to or less than a predefined standard deviation determination value. When the noise value for the subject bearing region is greater than the predefined standard deviation determination value, the CPU 61 sets the standard deviation σ to a preset high light level standard deviation σ2. The low light level standard deviation σ1 is less than the high light level standard deviation σ2. In the present embodiment, the low light level standard deviation σ1 is the standard deviation of the normal distribution ND1 illustrated in FIG. 26. The high light level standard deviation σ2 is the standard deviation of the normal distribution ND2 illustrated in FIG. 26.

In the LiDAR device 1 thus configured, the controller 3 calculates the multiplier coefficient for each of the plurality of bearing regions OR(i, j) such that the multiplier coefficient is positively correlated with the level of background light for the subject bearing region. The term "positively correlated with the level of background light" not only means that the multiplier coefficient continuously increases with increasing level of background light, but also means that the multiplier coefficient stepwise increases with increasing level of background light.

That is, in cases where there is a vehicle located at the subject bearing region, the multiplier coefficient decreases for the color of the vehicle with low background light level (e.g., black) and increases for the color of the vehicle with high background light level (e.g., white).

With this configuration, the LiDAR device 1 can inhibit integration of unsuitable coefficient-multiplied waveform data in the case of a vehicle color with a low background light level, and can increase the effectiveness of improving the detection sensitivity of the light receiving unit 30 by integration of coefficient-multiplied waveform data in the case of a vehicle color with a high background light level.

In the embodiment described above, the process steps S252 and S260 correspond to a process performed by the coefficient calculation unit 603 (see FIG. 1B).

As above, while the specific embodiments of the present disclosure have been described above, the present disclosure is not limited to the above-described embodiments, and may be implemented with various modifications.

First Modification

For example, in each of the above embodiments, the coefficient-multiplied waveform data for the subject bearing region and the bearing regions immediately adjacent to the subject bearing region (i.e., the bearing regions that are one column or one row away from the subject bearing region) are integrated. In one modification, the coefficient-multiplied waveform data for the subject bearing region and the bearing regions that are one to multiple columns or one to multiple rows away from the subject bearing region may be integrated.

Second Modification

In each of the above embodiments, the filtering process using a bilateral filter is performed. In one modification, instead of the bilateral filter, any other filter that retains and smooths the edges of the waveform may be used in the filtering process.

Third Modification

In the above second embodiment, integration of the coefficient-multiplied waveform data is prohibited when the vehicle speed Vv is lower than the ranging determination value J2. In one modification, the controller 3 may determine, based on information from the navigation device 73, whether the vehicle is traveling on a freeway, and prohibit integration of the coefficient-multiplied waveform data when the vehicle is traveling on a freeway. That is, when the controller 3 determines that the vehicle is traveling on a freeway, the controller 3 may determine that the vehicle speed Vv exceeds 80 km/h.

Fourth Modification

In the above first embodiment, the all-bearing standard deviation Var is calculated using the result of detection by the light receiving unit 30. In one modification, the all-bearing standard deviation Var may be calculated based on image data acquired from a camera configured to image surroundings of the own vehicle.

Fifth Modification

In the above fifth embodiment, the standard deviation σ of the normal distribution represented by the above relational expression (1) is set stepwise depending on the noise value for the subject bearing region. In one modification, the standard deviation σ may be changed continuously depending on the noise value for the subject bearing region.

The controller 3 and its method described in the present disclosure may be implemented by a dedicated computer including a processor and a memory programmed to execute one or more functions embodied by computer programs. Alternatively, the controller 3 and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

A plurality of functions possessed by one constituent element in the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in the foregoing embodiments may be omitted. At least some of the components in the foregoing embodiments may be added to or replaced with the other embodiments.

Besides the LiDAR device 1 described above, the present disclosure can be implemented in various modes such as a system including the LiDAR device 1 as a constituent element, a program for causing a computer to serve as the LiDAR device 1, a non-transitory tangible storage medium, such as a semiconductor memory, storing this program, a ranging method, and others.

What is claimed is:

1. A ranging device comprising:
   a light emitting unit configured to emit light;
   a light detection unit configured to detect reflected light;
   a background light calculation unit configured to calculate, for each of a plurality of bearing regions formed by dividing a light irradiated region that is irradiated with the light, a background light level parameter related to a level of background light arriving from the bearing region based on a result of detection by the light detection unit;
   a subject bearing-azimuth selection unit configured to sequentially select one of the plurality of bearing regions as a subject bearing region;
   a coefficient calculation unit configured to calculate a multiplier coefficient for each of the subject bearing region selected by the subject bearing-azimuth selection unit and a plurality of peripheral bearing regions around the subject bearing region such that the multiplier coefficient for each of the plurality of peripheral bearing regions is negatively correlated with a difference between the background light level parameter for the subject bearing region and the background light level parameter for the peripheral bearing region;
   a ranging waveform generation unit configured to generate, for each of the plurality of bearing regions, ranging waveform data indicating time variations of a light detection parameter until expiration of a preset ranging period from emission of the light, the light detection parameter indicating the result of detection by the light detection unit;
   a coefficient-multiplied waveform generation unit configured to generate, for each of the subject bearing region and the plurality of peripheral bearing regions, coefficient-multiplied waveform data acquired by multiplying the corresponding ranging waveform data by the corresponding multiplier coefficient;
   an integrated waveform generation unit configured to generate integrated waveform data by integrating the coefficient-multiplied waveform data for the subject bearing region and the plurality of peripheral bearing regions; and
   a measurement unit configured to measure a distance to an object reflecting the light using the integrated waveform data generated by the integrated waveform generation unit.

2. The ranging device according to claim 1, further comprising:
   a standard deviation calculation unit configured to calculate a standard deviation parameter related to the standard deviation of the levels of background light over the entire light irradiated region; and
   a deviation prohibition unit configured to prohibit execution of processing by at least the background light calculation unit, the subject bearing-azimuth selection unit, and coefficient calculation unit in cases where the standard deviation parameter is equal to or less than a preset deviation determination value.

3. The ranging device according to claim 1, wherein the coefficient calculation unit is configured to calculate the multiplier coefficient for each of the plurality of peripheral bearing regions such that the multiplier coefficient is positively correlated with the level of background light for the subject bearing region.

4. The ranging device according to claim 1, further comprising:
   a background light waveform generation unit configured to generate, for each of the plurality of bearing regions, based on the result of detection by the light detection unit, background light waveform data indicating time variations of the light detection parameter within a background light acquisition period set not to overlap with the ranging period; and
   a filtering unit configured to perform a filtering process on the background light waveform data for each of the plurality of bearing regions,
   wherein the background light calculation unit is configured to calculate, for each of the plurality of bearing regions, the background light level parameter using the background light waveform data on which the filtering process has been performed by the filtering unit.

5. The ranging device according to claim 1, wherein
the background light calculation unit is configured to calculate the background light level parameter based on the result of detection by the light detection unit immediately prior to a start of the ranging period.

6. The ranging device according to claim 1, wherein
the ranging device is configured to be mounted to a vehicle, and further comprises;
a vehicle speed determination unit configured to determine whether a travel speed of the vehicle is equal to or lower than a preset vehicle speed determination value; and
a vehicle speed prohibition unit configured to, in response to the vehicle speed determination unit determining that the travel speed of the vehicle is equal to or lower than the preset vehicle speed determination value, prohibit execution of processing by at least the background light calculation unit, the subject bearing-azimuth selection unit, and the coefficient calculation unit.

7. The ranging device according to claim 1, wherein
the ranging device is configured to be mounted to a vehicle, and further comprises a lane detection unit configured to detect a position of a traveled lane in which the vehicle is traveling,
the subject bearing-azimuth selection unit is configured to, based on a result of detection by the lane detection unit, select, among the plurality of bearing regions, the bearing region where the traveled lane is positioned as the subject bearing region.

8. The ranging device according to claim 1, wherein
the ranging device is is configured to be mounted to a vehicle, and further comprises a road shape acquisition unit configured to acquire road map data indicating a shape of a road around the vehicle, and
the subject bearing-azimuth selection unit is configured to, based on the acquired road map data, select, among the plurality of bearing regions, the bearing region where the road around the vehicle is positioned as the subject bearing region.

* * * * *